(12) United States Patent
Takeda

(10) Patent No.: US 10,145,754 B2
(45) Date of Patent: Dec. 4, 2018

(54) METHOD AND APPARATUS FOR DETECTING GAS LEAKAGE FROM RADIOACTIVE MATERIAL SEALED CONTAINER

(71) Applicant: CENTRAL RESEARCH INSTITUTE OF ELECTRIC POWER INDUSTRY, Tokyo (JP)

(72) Inventor: Hirofumi Takeda, Chiba (JP)

(73) Assignee: Central Research Institute of Electric Power Industry, Tokyo (JP)

( * ) Notice: Subject to any disclaimer, the term of this patent is extended or adjusted under 35 U.S.C. 154(b) by 508 days.

(21) Appl. No.: 15/292,230

(22) Filed: Oct. 13, 2016

(65) Prior Publication Data

US 2017/0108396 A1   Apr. 20, 2017

(30) Foreign Application Priority Data

Oct. 14, 2015   (JP) .................. 2015-202652

(51) Int. Cl.
  *G21F 5/10*   (2006.01)
  *G01M 3/00*   (2006.01)
  *G21F 5/12*   (2006.01)
(52) U.S. Cl.
  CPC .............. *G01M 3/002* (2013.01); *G21F 5/12* (2013.01); *G21F 2005/125* (2013.01)
(58) Field of Classification Search
  CPC .......... G01M 3/002; G21F 2005/125
  See application file for complete search history.

(56) References Cited

FOREIGN PATENT DOCUMENTS

| JP | 2002202400 A | | 7/2002 |
|----|--------------|---|--------|
| JP | 2003240891 A | * | 8/2003 |
| JP | 2004077124 A | | 3/2004 |
| JP | 2004226385 A | | 8/2004 |
| JP | 2005265443 A | | 9/2005 |

OTHER PUBLICATIONS

Takeda, Hirofumi, Masumi Wataru, Koji Shirai, and Toshiari Saegusa. "Development of the Detecting Method of Helium Gas Leak from Canister." Nuclear Engineering and Design 238, No. 5 (2008): 1220-226. doi:10.1016/j.nucengdes.2007.03.037.*
Yoo, Seung Hun, Hee Cheon No, Hyeun Min Kim, and Eo Hwak Lee. "Full-scope Simulation of a Dry Storage Cask Using Computational Fluid Dynamics." Nuclear Engineering and Design 240, No. 12 (2010): 4111-122. doi:10.1016/j.nucengdes.2010.08.009.*

* cited by examiner

*Primary Examiner* — Clayton E Laballe
*Assistant Examiner* — Leon W Rhodes, Jr.
(74) *Attorney, Agent, or Firm* — The Webb Law Firm

(57) ABSTRACT

A method for detecting gas leakage from a radioactive material sealed container includes measuring a temperature at a bottom portion of a metallic sealed container. A feeding air temperature of external air passing between the metallic sealed container and a concrete-made storage container is also measured. Presence of leakage of inactive gas is determined by comparing the temperatures or by utilizing a physical amount calculated by using the temperatures.

11 Claims, 17 Drawing Sheets

FIG. 1A
FIG. 1B
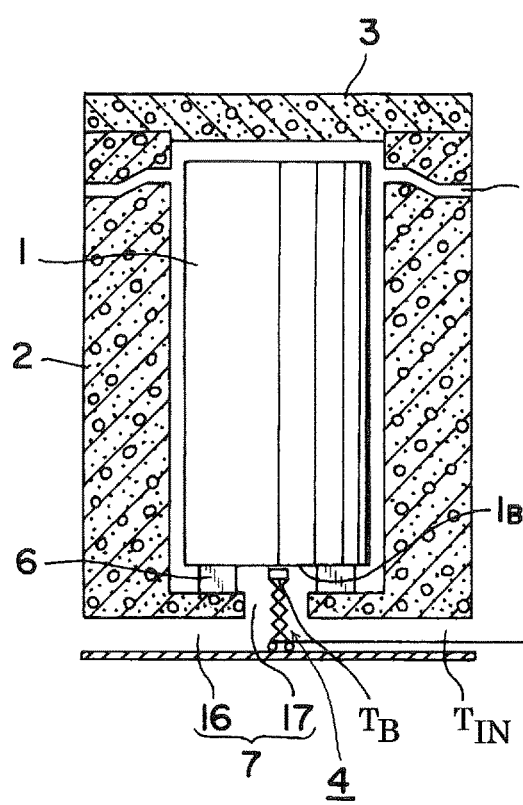
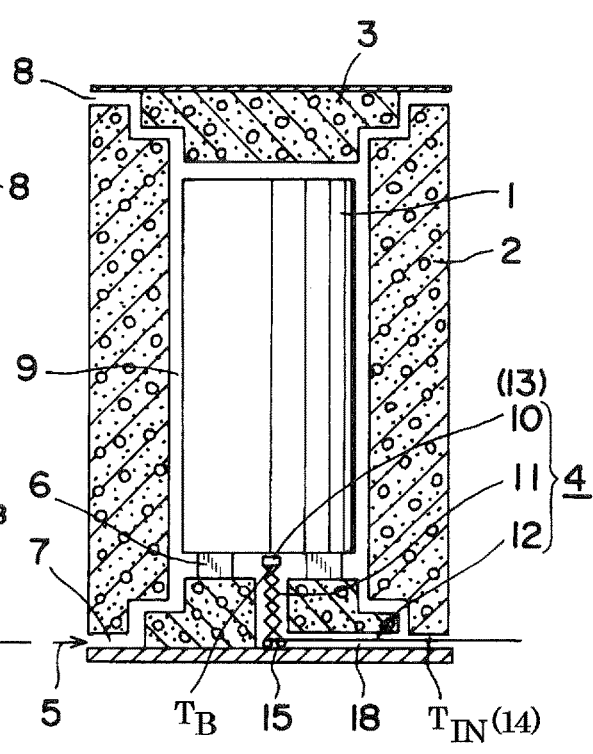

Solid : Wall of Canister(Stainless)  $\lambda s=16.0(W/m/K)$, $ls=0.016(m)$

METHOD AND APPARATUS FOR DETECTING GAS LEAKAGE FROM RADIOACTIVE MATERIAL SEALED CONTAINER

CROSS-REFERENCE TO RELATED APPLICATION

This application claims priority to Japanese Patent Application No. 2015-202652 filed Oct. 14, 2015, the disclosure of which is hereby incorporated in its entirety by reference.

BACKGROUND

Technical Field

The present invention relates to a method and an apparatus for detecting gas leakage from a radioactive material sealed container. More specifically, the present invention particularly relates to a method and an apparatus for detecting leakage of inactive gas such as helium filled in a metallic canister of a concrete cask.

Related Art

A concrete cask has been a focus of constant attention as a storage means for high radioactive material represented by spent nuclear fuel in a nuclear reactor. The concrete cask is formed of: a cylindrical sealed container made of stainless steel and having a structure that stores spent fuel and seals the same by welding (hereinafter referred to as canister); and a non-sealed concrete-made storage container that has a shielding function and houses the canister (hereinafter referred to as concrete container). The concrete cask is a dry storage facility adapted to remove decay heat of spent fuel contained inside the canister by naturally convecting external air through an air ventilation port provided at upper and lower portions of the concrete container.

The canister has a sealed structure obtained by welding so as not to leak sealed radioactive material to the outside, and also adapted to transfer the decay heat of the spent fuel contained inside the canister via helium to the canister by sealing helium that is inactive gas having thermal conductivity higher than air. Therefore, in the event of helium leakage, there may be a concern that contamination caused by leakage of the radioactive material and insufficient heat removal of the decay heat occur.

In the case of assuming that the concrete cask is installed near coast, cooling air contains salt. Therefore, there may be a concern that a sealing function of the canister is lost by stress corrosion cracking. Additionally, in the case of storing the concrete cask in an inland area also, a deterioration/degradation problem cannot be entirely ignored in consideration of long-term storage, and there may be a concern that helium sealed inside the canister leaks due to a defect, corrosion, and the like at a welding portion of the canister.

A phenomenon of helium leakage is an event to be avoided because radioactive material may be emitted to the environment. Therefore, in the event of such a phenomenon, immediately detecting the event and taking countermeasures are needed. Accordingly, development of a technology to detect helium leakage at an early stage is demanded.

In response to this demand, there is a proposed method of detecting helium leakage, in which a temperature difference between a center temperature at a bottom portion and a center temperature at a top portion in a canister is monitored, and in the case where the temperature difference is increased and a feeding air temperature is decreased, occurrence of gas leakage is determined (JP 2005-265443 A).

However, according to the technology disclosed in JP 2005-265443 A, since it is necessary to measure the temperatures at two points of the top portion and the bottom portion of the canister housed inside the concrete container, construction work for installing thermocouples at the two points of the top portion and the bottom portion of the cask is required.

SUMMARY

The present invention is directed to providing a method and an apparatus for detecting gas leakage from a canister as a radioactive material sealed container, in which presence of leakage of inactive gas can be detected by utilizing a temperature at a bottom portion of the canister and a feeding air temperature of external air.

A method for detecting gas leakage from a radioactive material sealed container corresponding to a mode to implement the technical idea of the present invention is a method for detecting leakage of inactive gas from a metallic sealed container of the radioactive material sealed container that includes: the metallic sealed container adapted to store and seal spent fuel and the inactive gas; and a non-sealed concrete-made storage container having a shielding function and adapted to store the metallic sealed container. The method includes:

measuring a temperature at a bottom portion of the metallic sealed container;

also measuring a feeding air temperature of external air passing between the metallic sealed container and the concrete-made storage container; and determining occurrence of leakage of the inactive gas when significant change appears in correlation between the temperature at the bottom portion of the metallic sealed container and the feeding air temperature or when change appears in a physical amount related to leakage of the inactive gas calculated by using the temperature at the bottom portion of the metallic sealed container and the feeding air temperature.

An apparatus for detecting gas leakage from a radioactive material sealed container corresponding to a mode to implement the technical idea of the present invention is an apparatus for detecting leakage of inactive gas from a metallic sealed container of the radioactive material sealed container that includes: the metallic sealed container adapted to store and seal spent fuel and the inactive gas; and a non-sealed concrete-made storage container having a shielding function and adapted to store the metallic sealed container. The apparatus includes:

a first temperature sensor adapted to measure a temperature at a bottom portion of the metallic sealed container;

a second temperature sensor adapted to measure a feeding air temperature of external air passing between the metallic sealed container and the concrete-made storage container; and a gas leakage estimation unit adapted to estimate occurrence of leakage of the inactive gas when significant change appears in correlation between the temperature at the bottom portion of the metallic sealed container and the feeding air temperature or when change appears in a physical amount related to leakage of the inactive gas calculated by using the temperature at the bottom portion of the metallic sealed container and the feeding air temperature.

According to the above-described method and the apparatus for detecting gas leakage from a radioactive material sealed container, leakage of filled gas such as helium from the metallic sealed container can be determined only from temperature information in the periphery of the bottom portion of the metallic sealed container. Therefore, temperature sensor installation work is required only at one place on the bottom portion side of the metallic sealed container, and construction is simpler compared to the case of installing thermocouples at two places of the top portion and the bottom portion of the metallic sealed container.

BRIEF DESCRIPTION OF DRAWINGS

FIG. 1A is a schematic diagram illustrating an embodiment of a method and an apparatus for detecting gas leakage from a radioactive material sealed container according to the present invention, which illustrates a concrete cask made of reinforced concrete and having an air inlet port at a bottom portion (Case 3);

FIG. 1B is a schematic diagram of an embodiment of an apparatus for detecting leaks with a measurement passage and having an improved air inlet port in a concrete cask made of a steel plate (concrete filled steel) that has the air inlet port on a bottom portion side surface (Case 1);

DETAILED DESCRIPTION

Figure 2A:
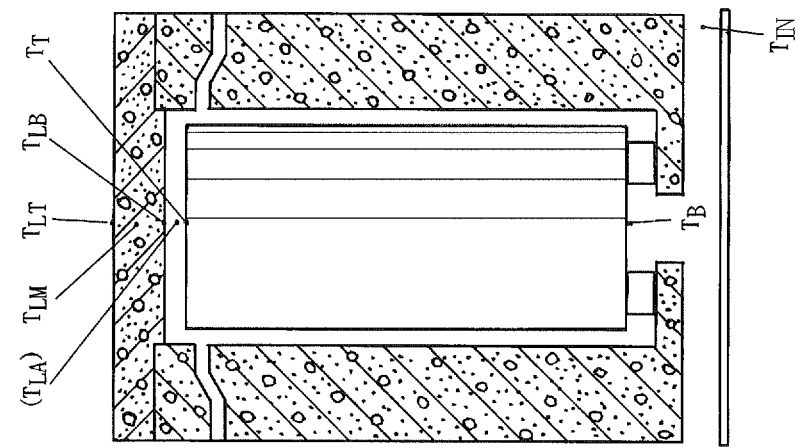
FIG. 2A is a schematic diagram illustrating a structure of a concrete cask used in helium leakage tests, which is made of a steel plate (concrete filled steel) and has an air inlet port on a bottom portion side surface (Case 1)

In the following, an embodiment as an exemplary aspect to implement a technical idea of the present invention will be described in detail using the drawings. In the present embodiment, exemplified is a case where an apparatus for detecting gas leakage from a radioactive material sealed container illustrated in FIGS. 1A and 1B is applied. However, a structure, a shape, quality of material, and the like of the radioactive material sealed container in which the present invention is applied are not limited to the examples illustrated in FIGS. 1A and 1B.

The radioactive material sealed container of the present embodiment is a concrete-made dry cask or simply called a concrete cask, and formed of: a metallic sealed container having a structure adapted to store and seal spent fuel by welding (hereinafter referred to as a canister 1); and a non-sealed concrete-made storage container having a shielding function and adapted to house the canister 1 (hereinafter referred to as a concrete container 2). The radioactive material sealed container of the present embodiment has a structure in which decay heat of the spent fuel contained inside the canister 1 is removed by naturally convecting external air 5 via an air inlet port 7 and an outlet port 8 which are air ventilation ports provided at upper and lower portions of the concrete container 2.

The canister 1 is supported by a supporting leg 6, and forms a flow passage 9 in a space with the concrete container 2 around the canister.

Meanwhile, a movable thermometer 4 attached with a lifter is installed at the bottom portion of the canister 1.

The canister 1 is generally made of metal such as stainless steel and formed as a cylindrical sealed container by welding. The canister 1 generally has a double lid and is sealed by welding after the container containing a radioactive material and a space between an inner lid and an outer lid are filled with inactive gas, but may also have a single lid depending on circumstances.

As the gas sealed inside the canister 1, for example, helium (He) is preferable. Helium is the inactive gas having thermal conductivity higher than air. The present invention can be implemented under negative pressure, but heat of the radioactive material is transmitted to the canister 1 and heat removal performance may be improved by making helium to positive pressure. Furthermore, helium may also be kept at high pressure in order to improve heat removal performance, and for example, in a case implemented in United States, helium is kept at about 8 atmospheric pressure.

Note that filled gas is not necessarily limited to helium, and other inactive gases having the thermal conductivity higher than air may also be used as well. In this case, the adopted inactive gas is to be a detecting target.

Figure 2B:
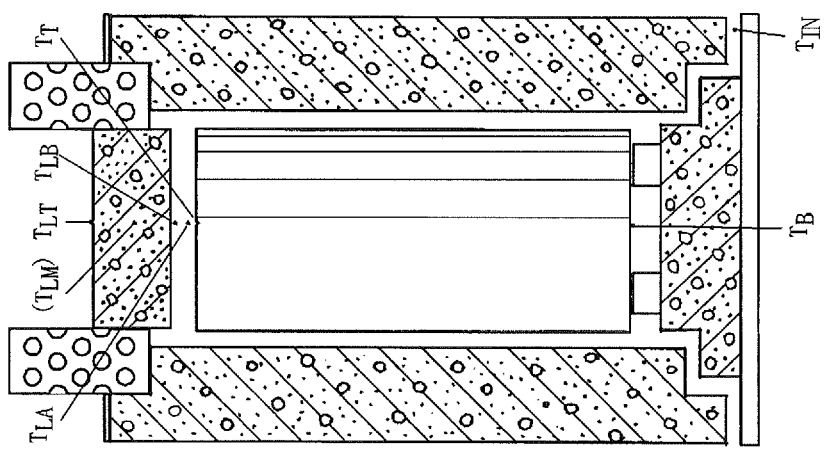
FIG. 2B is a schematic drawing of a concrete cask made of a steel plate (concrete filled steel) and having an air inlet port on a bottom portion side surface using a lid having outlet ducts with low flow resistance (Case 2)
Figure 2C:
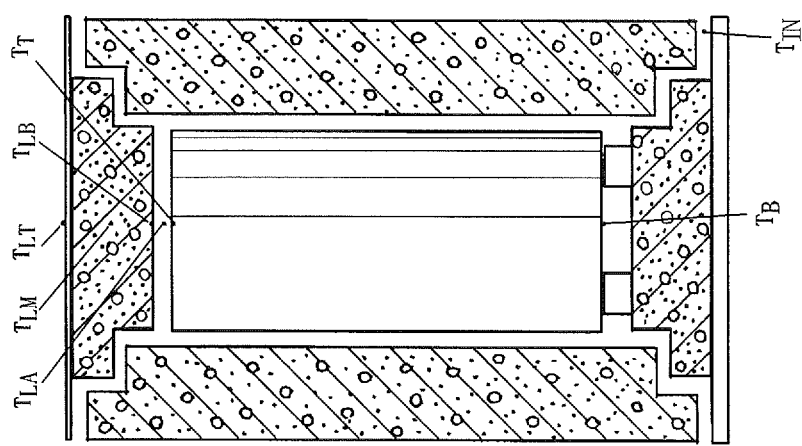
FIG. 2C is a schematic drawing of a concrete cask made of reinforced concrete and having an air inlet port at a bottom portion (Case 3)

Meanwhile, the structure of the concrete cask may be a concrete cask made of a steel plate (CFS: concrete filled steel) illustrated in FIG. 2A, a concrete cask made of CFS using a lid having outlet ducts with low flow resistance illustrated in FIG. 2B, or a concrete cask made of reinforced concrete (RC) illustrated in FIG. 2C.

Furthermore, a form of an air inlet port may be a stepwise shape as illustrated in FIGS. 2A and 2B or a cross groove shape as illustrated in FIG. 2C. The air inlet port having the cross groove shape is formed of: a cross-shaped groove 16 that passes a center of a bottom portion of the concrete container 2; and a vertical hole 17 penetrating the inside of the container at an intersecting portion with the groove.

Additionally, as for cooling fluids to be introduced into the concrete container 2, the external air is directly made to flow inside in the present embodiment, but depending on circumstances, air that has been adjusted to have a predetermined temperature range and humidity or a cooling gas other than air may also be fed inside.

Here, in the case of the concrete cask illustrated in FIG. 1A, first and second temperature sensors 13 and 14 can be easily arranged at predetermined positions inside the concrete container 2 housing the canister 1 after the concrete cask is installed by inserting the movable thermometer 4 attached with the lifter by utilizing the air inlet port 7 having a cross groove shape.

Furthermore, in the case of the concrete container 2 illustrated in FIG. 1B, since the air inlet port 7 is formed stepwise, access to a canister bottom surface $1_B$ by the movable thermometer 4 attached with the lifter is difficult. Therefore, preferably, a measurement passage 18 penetrating to a center portion is preliminarily formed at the time of manufacturing the concrete cask.

Note that forming the first and second temperature sensors 13 and 14 by the movable thermometers 4 attached with the lift is not necessarily required. For example, the first and second temperature sensors 13 and 14 may also be separately fixed and arranged beforehand at the canister bottom surface $1_B$ and the air inlet port 7 as independent temperature sensors respectively (illustration omitted).

In the movable thermometer 4 attached with the lifter, a metal plate 10 on which the first temperature sensor 13 is pasted is mounted on a lifter 11 (elevation mechanism), and the lifter 11 is formed of, for example, an extendable coil, a spring, a pantograph type extendable mechanism, a fluid pressure extendable mechanism, or the like. The movable thermometer 4 attached with the lifter is adapted to push the metal plate 10 against the canister bottom surface $1_B$ or separate the metal plate from the canister bottom surface $1_B$ by upward and downward movement/elastic movement of the lifter 11.

In the case where the lifter 11 is inserted from the air inlet port 7, the lifter is attached at a tip of a rod 12 having a length of, for example, about 2 m that is sufficient to reach a point immediately below the canister bottom surface $1_B$.

Furthermore, the second temperature sensor 14 is installed at a position of the rod 12 located close to an entrance of the air inlet port 7 when the lifter 11 on the tip side of the rod 12 is sent to the point immediately below a center of the canister bottom surface $1_B$, and measures the feeding air temperature $T_{IN}$ at a portion close to the entrance of the air inlet port 7.

Furthermore, a rolling element 15 such as a wheel or a ball is provided at a lower side of the tip of the rod 12. With this structure, the lifter 11, metal plate 10, first temperature sensor 13, and second temperature sensor 14 attached to the rod 12 are easily moved together with the rod 12 and moved in and out relative to the concrete container 2. Furthermore, the lifter 11 at the rod 12 is moved up and down by an operating means (not illustrated) provided on an opposite side of the lifter 11 of the rod 12.

According to the movable thermometer 4 attached with the lifter that has the above-described structure, the canister bottom portion temperature $T_B$ and the feeding air temperature $T_{IN}$ at the air inlet port 7 can be measured at the same time by sending the lifter 11 located at the tip to the point immediately below the center of the canister bottom surface $1_B$ by using the rod 12, and then moving up the lifter 11 to push, against the canister bottom surface $1_B$, the metal plate 10 on which the first temperature sensor 13 is pasted. Furthermore, even in the event of failure such as deterioration/degradation caused by radioactive rays, replacement work can be easily performed because the first temperature sensor 13 can be detached from the canister bottom surface $1_B$ only by moving the lifter 11.

Here, preferably, the first temperature sensor 13 measures a temperature at a center in a radial direction of the canister bottom surface $1_B$. Temperature change at the canister bottom surface $1_B$ in the event of leakage of inactive gas is largest at the center position of the bottom surface. Therefore, by monitoring the temperature at the center position of the canister bottom surface $1_B$, detection sensitivity can be improved, and furthermore, it is expected that highly reliable gas leakage detection can be performed. However, it is not an essential condition for the first temperature sensor 13 to be accurately arranged at the center position and measure the temperature at the center in the radial direction of the canister bottom surface $1_B$. The first temperature sensor 13 may also be adapted to detect temperature change of the canister bottom surface $1_B$ at a position distant from the center.

As the respective temperature sensors 13, 14, for example, preferably the thermometer such as a thermocouple or a thermistor is used. In this case, in addition to a merit that the structure is simple and inexpensive, long-term stable operation can be expected because of the simple structure. These two temperature sensors 13, 14 are electrically connected to a temperature measurement device 19, and temperature measurement is performed by utilizing thermoelectromotive force provided by a Seebeck effect.

Meanwhile, in terms of improving detection sensitivity for inactive gas leakage, it is preferable that the first temperature sensor 13 directly measures the canister bottom portion temperature $T_B$ by being made to directly contact the canister bottom surface $1_B$. However, in this case, there may be problems simultaneously causing damage and deterioration/degradation by radioactive rays. Considering this, preferably, the first temperature sensor 13 is located on a back surface of the metal plate 10 directly pushed against the canister bottom surface $1_B$ (namely, surface on an opposite side not facing the canister bottom surface $1_B$), and measures a back surface temperature $T_{BI}$ of the metal plate 10.

In this case, the first temperature sensor 13 is protected from radioactive rays because the metal plate 10 functions as a protection cover and shields the radioactive rays such as γ-rays. Additionally, since the metal plate 10 has excellent thermal conductivity, and the back surface temperature $T_{BI}$ of the metal plate 10 becomes substantially same as the canister bottom portion temperature $T_B$, a result same as the case of directly measuring the canister bottom portion temperature $T_B$ can be obtained.

In the light of the above, according to the present invention, the first temperature sensor 13 may also be made to directly contact the canister bottom surface $1_B$ and directly measure the canister bottom portion temperature $T_B$, or may also measure the canister bottom portion temperature $T_B$ indirectly or in a non-contacting manner by, for example, interposing a metal plate, using a non-contact type thermometer, or the like.

The apparatus for detecting gas leakage according to the present embodiment applied to the above-described concrete cask includes: the first temperature sensor 13 adapted to measure the canister bottom portion temperature $T_B$ as the temperature at the bottom portion of the metallic sealed container; the second temperature sensor 14 adapted to measure the feeding air temperature $T_{IN}$ at the air inlet port 7 of the external air passing between the canister 1 and the concrete container 2; and a gas leakage estimation unit 21 adapted to estimate occurrence of inactive gas leakage when significant change appears in correlation between the temperature measured by the first temperature sensor, namely, the canister bottom portion temperature $T_B$ and the temperature measured by the second temperature sensor, namely, the feeding air temperature $T_{IN}$ or when change appears in a physical amount related to inactive gas leakage calculated by using the canister bottom portion temperature $T_B$ and the feeding air temperature $T_{IN}$.

Figure 10:
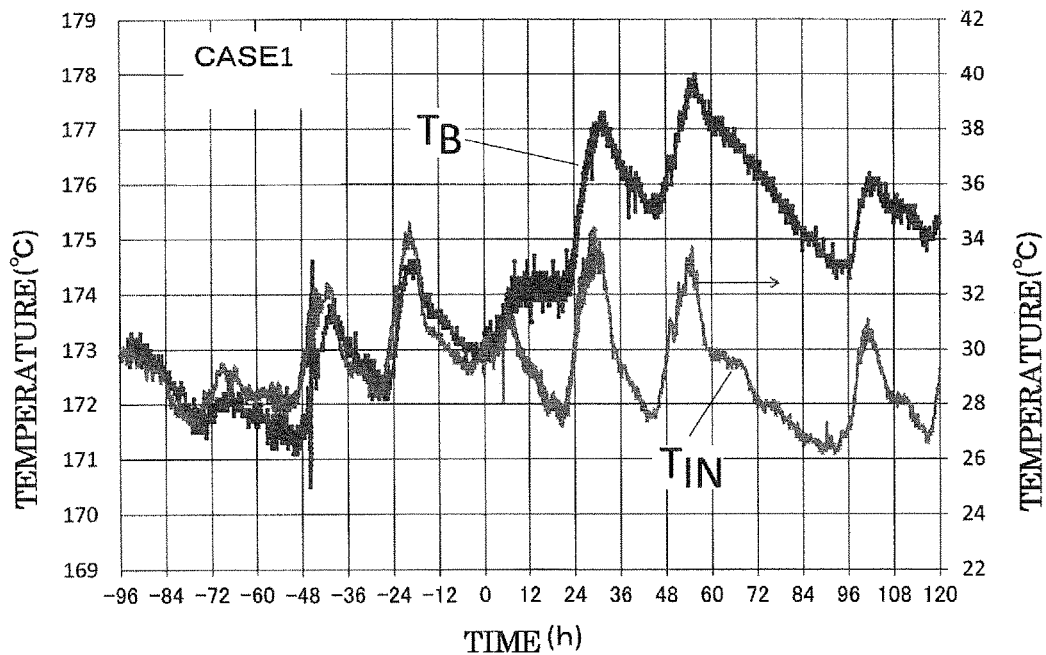
FIG. 10 is a graph illustrating a relation between the canister bottom portion center temperature $T_B$ and the feeding air temperature $T_{IN}$ before and after helium leakage in Case 1.
Figure 11:
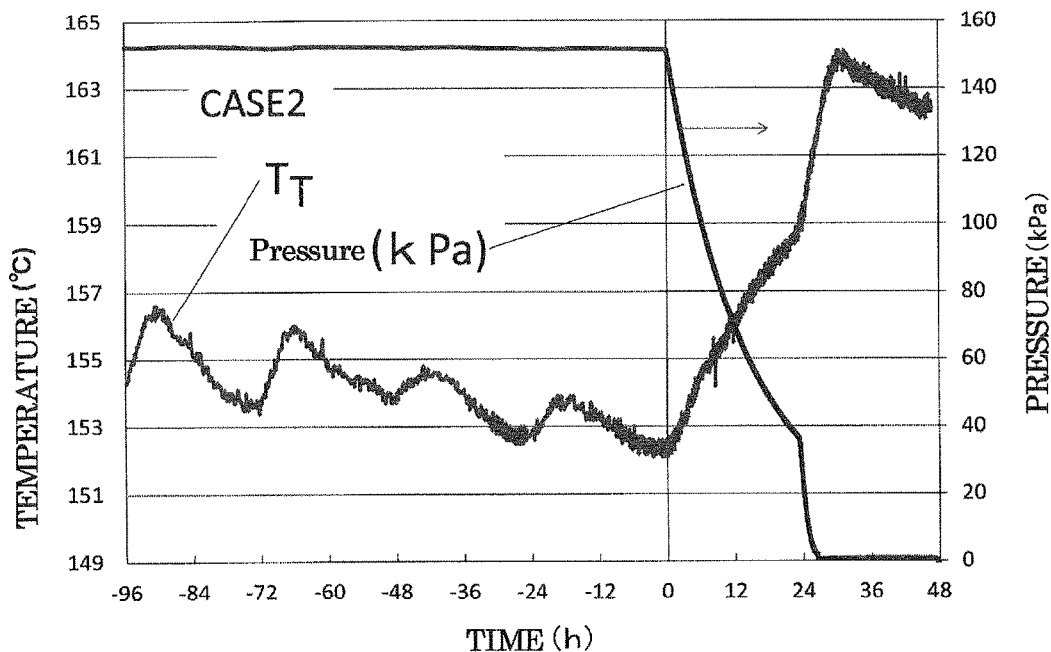
FIG. 11 is a graph illustrating change of the canister bottom portion center temperature $T_B$ relative to the inner pressure of the canister before and after helium leakage in Case 2.
Figure 12:
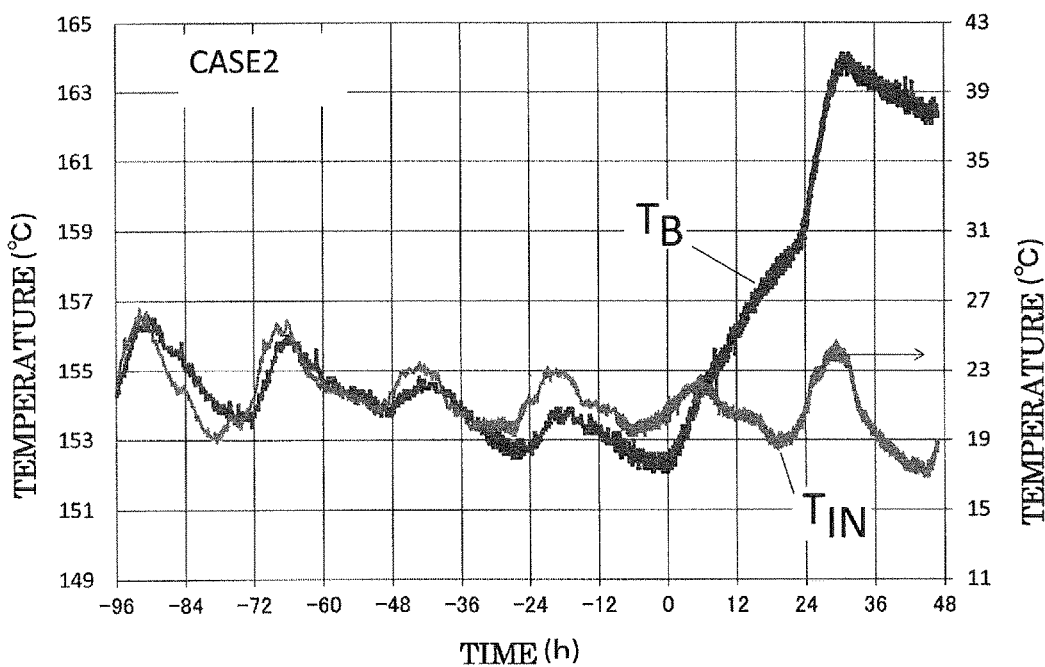
FIG. 12 is a graph illustrating a relation between the canister bottom portion center temperature $T_B$ and the feeding air temperature $T_{IN}$ before and after helium leakage in Case 2.
Figure 13:
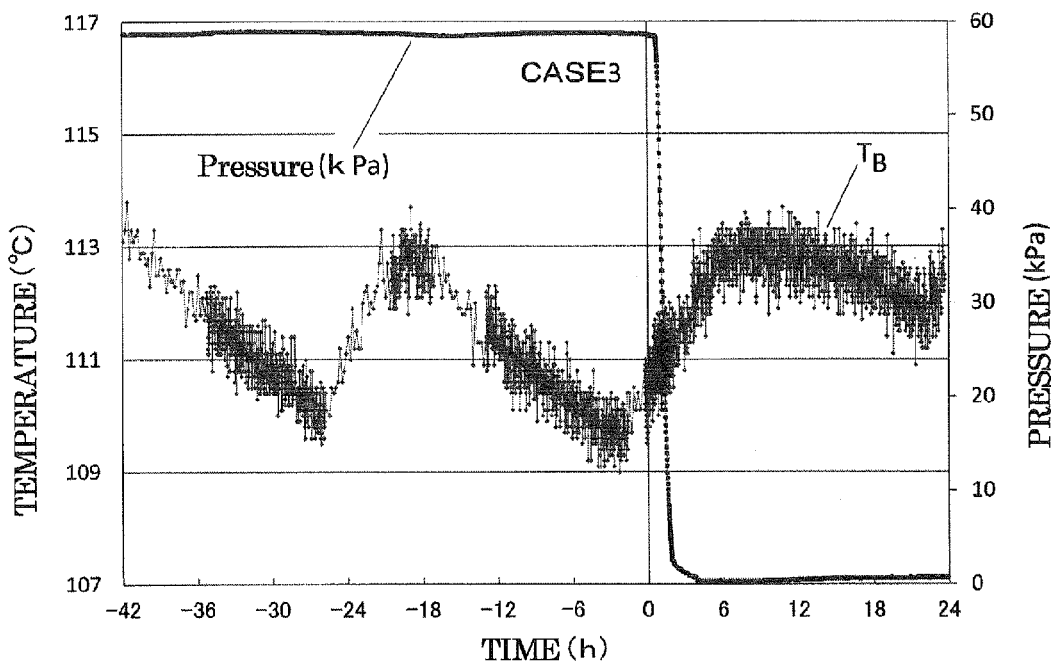
FIG. 13 is a graph illustrating change of the canister bottom portion center temperature $T_B$ relative to the inner pressure of the canister before and after helium leakage in Case 3.

Here, as illustrated in FIG. 12 or 10, the time when the significant change appears in the correlation between the canister bottom portion temperature $T_B$ and the feeding air temperature $T_{IN}$ corresponds to, for example: a case where the feeding air temperature $T_{IN}$ decreases while the canister bottom portion temperature $T_B$ starts increasing after helium as the inactive gas starts leaking; a case where the feeding air temperature $T_{IN}$ decreases while the canister bottom portion temperature $T_B$ does not change for a certain period without following decrease of the feeding air temperature $T_{IN}$ and later starts increasing, and then a difference from the feeding air temperature $T_{IN}$ becomes gradually enlarged; and the like.

In other words, occurrence of inactive gas leakage can be determined when the difference between the canister bottom portion temperature $T_B$ and the feeding air temperature $T_{IN}$ is enlarged with time along with significant rising of the canister bottom portion temperature $T_B$ that is temperature rising not only following the daily fluctuation of the feeding air temperature $T_{IN}$, and also the difference therebetween tends to be kept constant.

Therefore, by monitoring and comparing the canister bottom portion temperature $T_B$ and the feeding air temperature $T_{IN}$, it is possible to intuitively detect leakage of the inactive gas such as helium from the canister based on visual information indicating that the difference therebetween is enlarged, in other words, based on visual information indicating significant fluctuation of the temperature difference.

On the other hand, the physical amount, in other words, a physical quantity/a physical value, related to inactive gas leakage calculated by using the canister bottom portion temperature $T_B$ and the feeding air temperature $T_{IN}$ corresponds to specifically, for example: a temperature $T_H$ of helium as the inactive gas at a position in the vicinity of the bottom surface inside the canister; or a heat flux $q_3$ emitted from the canister bottom surface to atmosphere below this bottom surface. Meanwhile, specifically, the atmosphere below the canister bottom surface is cooling air existing in a space with the concrete container.

In the case of acquiring these physical amounts and determining gas leakage by utilizing change thereof, influence of fluctuation of the feeding air temperature $T_{IN}$ to the canister bottom portion temperature $T_B$ is easily excluded. Therefore, this method is also useful in the case where a rising amount of the canister bottom portion temperature $T_B$ is little. For example, in the case where pressure change is about 0.5 atmospheric pressure like Case 1 and Case 3 described later, a difference between the canister bottom portion temperature $T_B$ and the feeding air temperature $T_{IN}$ in the event of gas leakage is not so large. Therefore, it may be difficult to determine presence of change in correlation therebetween. In such a case, a method utilizing a physical amount related to inactive gas leakage calculated by using data of two actual measurement temperatures of the canister bottom portion temperature $T_B$ and the feeding air temperature $T_{IN}$ is useful.

In the following, a description will be provided for matters and results of experiments performed by the inventor of the present invention with respect to influence given to a peripheral temperature of the canister bottom portion caused by leakage of helium as the inactive gas from the canister in the radioactive material sealed container, and additionally, a method of estimating gas leakage will be described.

First, a description will be provided for capability of estimating occurrence of the inactive gas leakage when the canister bottom portion temperature $T_B$ and the feeding air temperature $T_{IN}$ are monitored and significant change appears in correlation between the actual measurement temperatures thereof.

(1) Helium Leakage Test Conditions

Leakage tests of helium as inactive gas from a canister were performed using a full-scale concrete cask model.

The cask structures used in the leakage tests are illustrated in FIGS. 2A, 2B, and 2C. Additionally, test conditions are described in Table 1.

TABLE 1

| CASE No. | Cask Structure | Inner Pressure Before Leakage (kPa) | Leakage Rate (Pa · m³/s) |
|---|---|---|---|
| CASE 1 | CFS | 56 | 4.86 × 10⁻¹ |
| CASE 2 | CFS (Lid having outlet ducts with low flow resistance) | 151 | 5.16 |
| CASE 3 | RC | 59 | 3.60 × 10 |

<Case 1>

An openable/closable valve (not illustrated) was provided at a canister 1 of a concrete cask having a CFS structure illustrated in FIG. 2A, and also an electric heater (not illustrated) simulating a nuclear reactor spent fuel rod was housed inside the canister 1, and helium was filled at an atmospheric pressure level (i.e., 0 kPa in gauge pressure). Furthermore, adjustment was made so as to reproduce actual heat generation from the spent fuel rod by heat generation of the electric heater, and an initial storage state of spent nuclear fuel in the concrete cask was simulated (specifically, heat generation amount 22.6 kW). Inner pressure of the canister 1 rose by heat generation of the electric heater, and a steady state was obtained at gauge pressure 56 kPa.

After that, a canister top portion temperature $T_T$, a canister bottom portion temperature $T_B$, and a feeding air temperature $T_{IN}$ were continuously measured by respective thermocouples provided at three points illustrated in FIG. 2A. Then, subsequently, helium was made to leak by loosening the valve provided at the canister 1, and pressure was reduced by 50 kPa in two days, and the inner pressure of the canister 1 was reduced to become nearly the atmospheric pressure level four days later.

Meanwhile, in the case where a storage period and a kind of a storage fuel are known, a heat generation amount of the stored spent nuclear fuel, namely, an amount of decay heat is a value that can be easily calculated by using an analysis code. Therefore, by specifying the kind of the storing fuel, the heat generation amount can be acquired by calculating the decay heat in accordance with the storage period. Also, since the heat generation amount can be calculated, a temperature inside the canister, namely, a temperature of the inactive gas can be acquired. Note that a type of the concrete cask, a storage period, and an initial inner pressure value are values that can be set for storage control in accordance with actuality.

<Case 2>

Additionally, helium was also filled same as above in a canister 1 of a concrete cask having a CFS structure in which a lid having outlet ducts with low flow resistance was used as illustrated in FIG. 2B. Then, inner pressure of the canister 1 was raised and a steady state was obtained at gauge pressure 151 kPa, and temperatures at three measurement points illustrated in FIG. 2B were continuously measured in the same manner as Case 1.

Furthermore, the inner pressure of the canister 1 was reduced to a nearly atmospheric pressure level in an about one day by leaking helium by loosening the valve.

<Case 3>

Helium was also filled same as above in a canister 1 of a concrete cask having an RC structure illustrated in FIG. 2C in which an air inlet port had a shape different from Cases 1 and 2. Then, inner pressure of the canister 1 was raised and a steady state was obtained at gauge pressure 59 kPa, and temperatures at three measurement points illustrated in FIG. 2C were continuously measured in the same manner as Case 1.

Furthermore, the inner pressure of the canister 1 was reduced to the nearly atmospheric pressure level in an about two to three hours by leaking helium by loosening the valve.

(2) Helium Leakage Test Results

Temperature measurement results at the respective measurement points are illustrated in FIGS. 3 to 14.

(i) First, in FIGS. 3 to 8, a description will be provided for a relation of the canister top portion temperature $T_T$ and the canister bottom portion temperature $T_B$ with the inner pressure inside the canister 1 and a relation of the canister top portion temperature $T_T$ and the canister bottom portion temperature $T_B$ with the feeding air temperature $T_{IN}$ in Cases 1 to 3.

Figure 3:
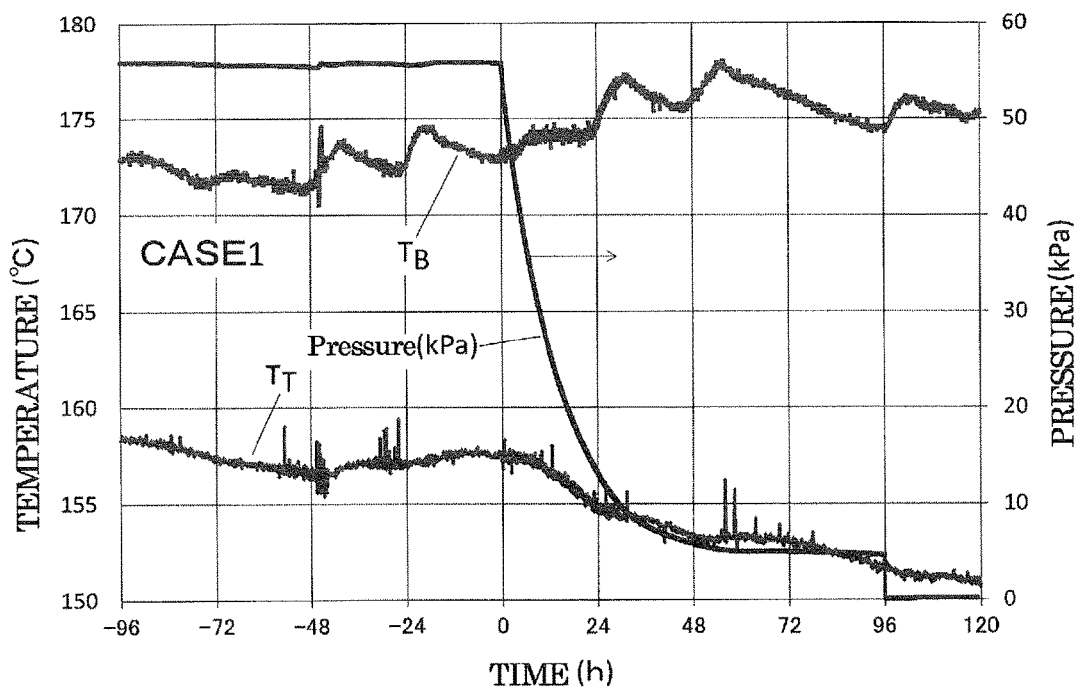
FIG. 3 is a graph illustrating change of a canister top portion center temperature $T_T$ and change of a canister bottom portion center temperature $T_B$ relative to inner pressure of a canister before and after helium leakage in Case 1.
Figure 4:
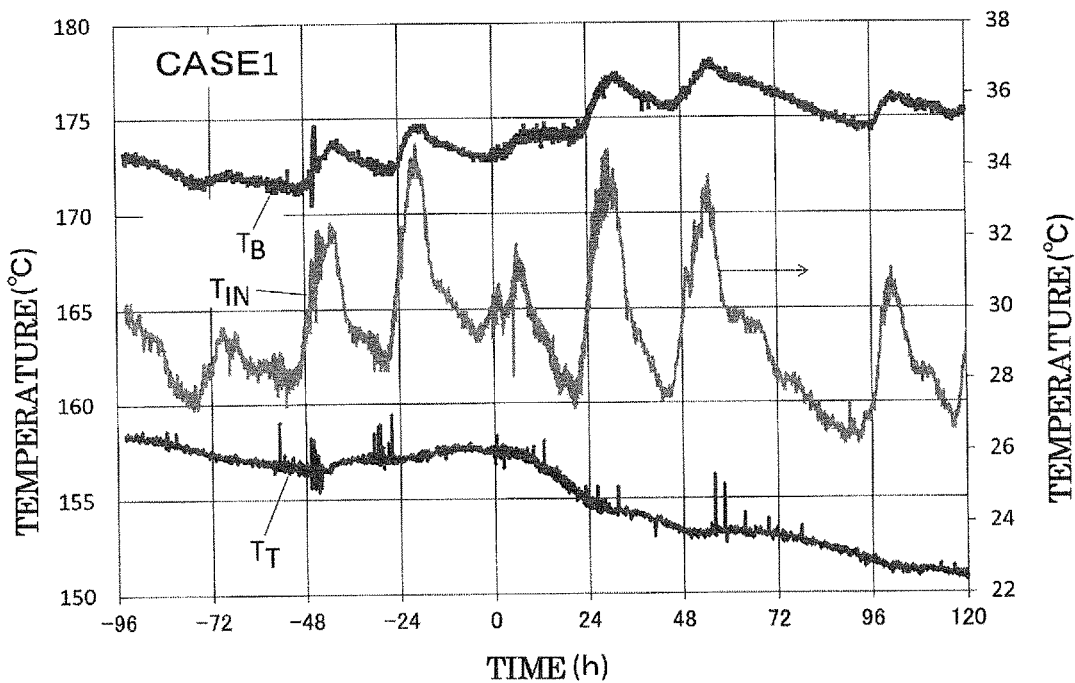
FIG. 4 is a graph illustrating a relation of the canister top portion center temperature $T_T$ and the canister bottom portion center temperature $T_B$ with a feeding air temperature $T_{IN}$ before and after helium leakage in Case 1.
Figure 5:
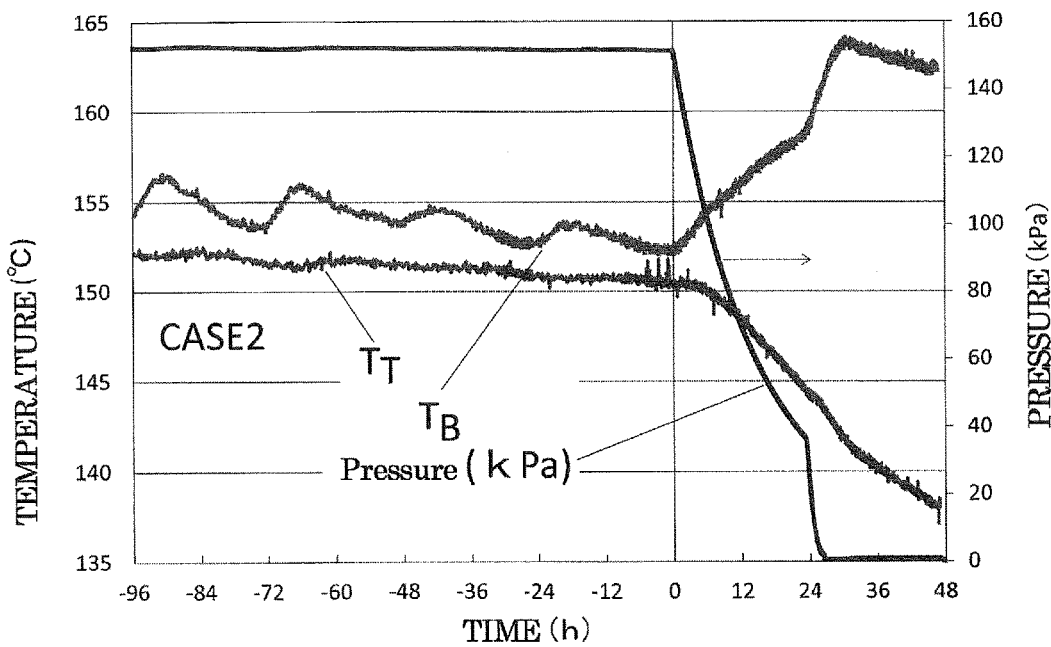
FIG. 5 is a graph illustrating change of a canister top portion center temperature $T_T$ and change of a canister bottom portion center temperature $T_B$ relative to inner pressure of a canister before and after helium leakage in Case 2.
Figure 6:
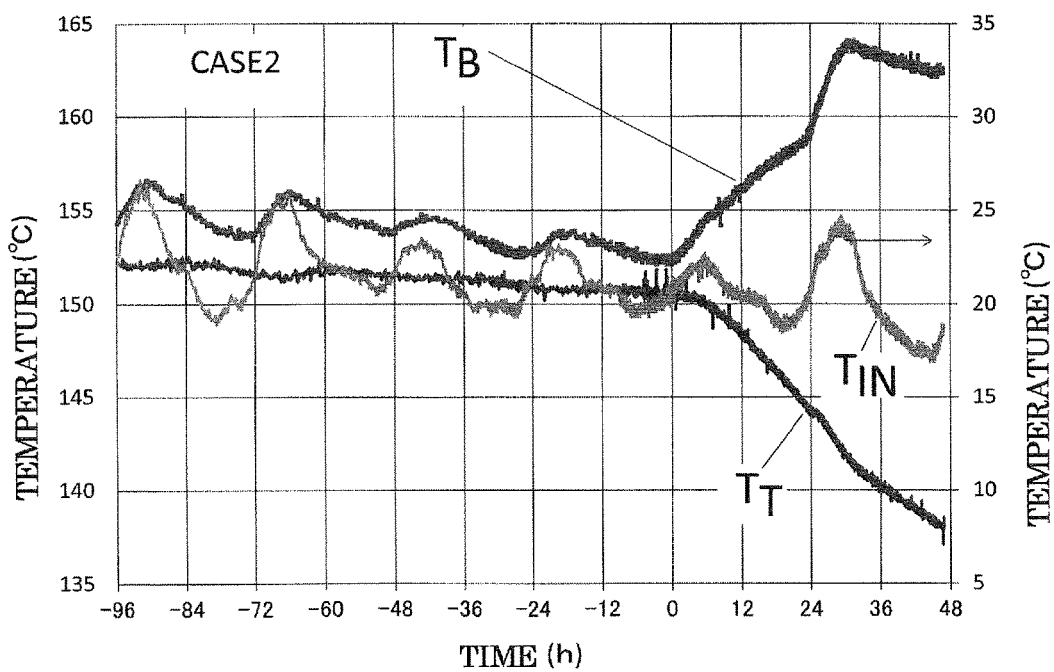
FIG. 6 is a graph illustrating a relation of the canister top portion center temperature $T_T$ and the canister bottom portion center temperature $T_B$ with an feeding air temperature $T_{IN}$ before and after helium leakage in Case 2.
Figure 7:
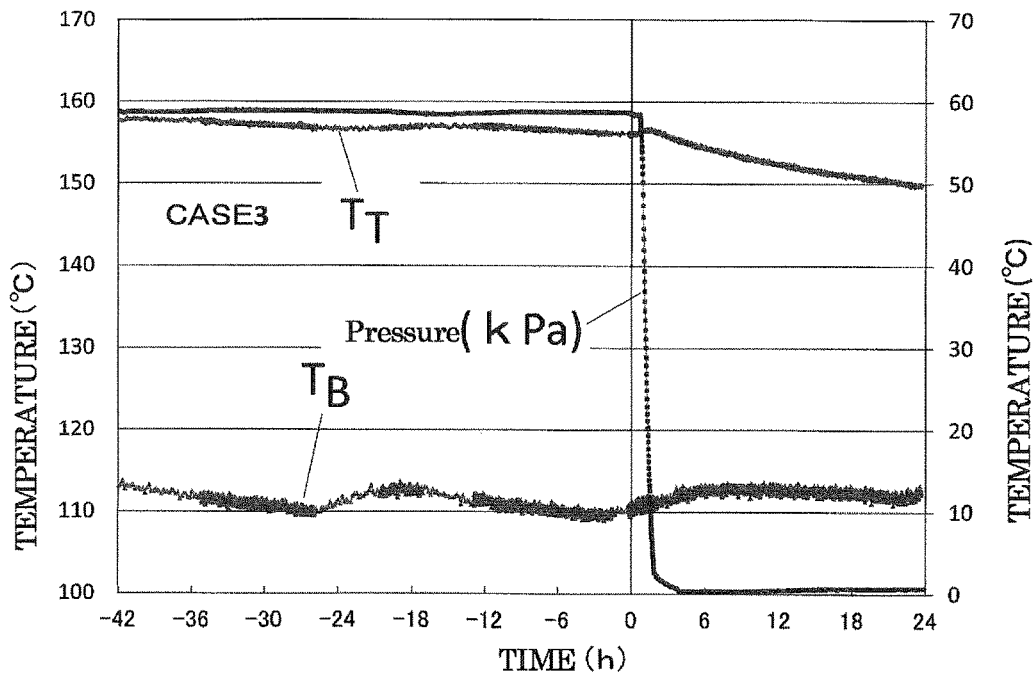
FIG. 7 is a graph illustrating change of a canister top portion center temperature $T_T$ and change of a canister bottom portion center temperature $T_B$ relative to inner pressure of a canister before and after helium leakage in Case 3.
Figure 8:
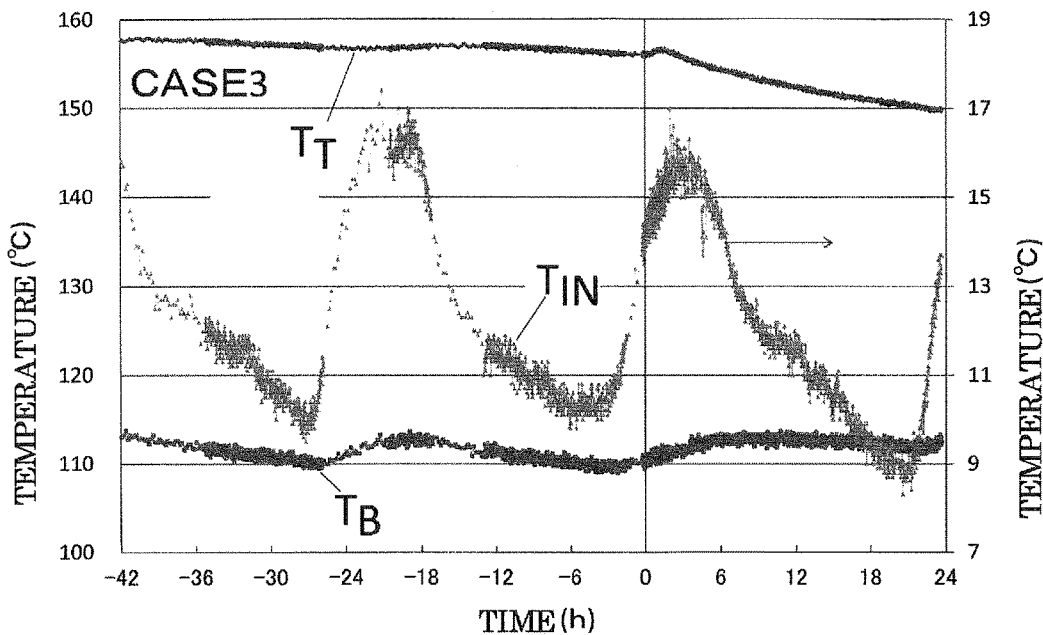
FIG. 8 is a graph illustrating a relation of the canister top portion center temperature $T_T$ and the canister bottom portion center temperature $T_B$ with an feeding air temperature $T_{IN}$ before and after helium leakage in Case 3.
Figure 9:
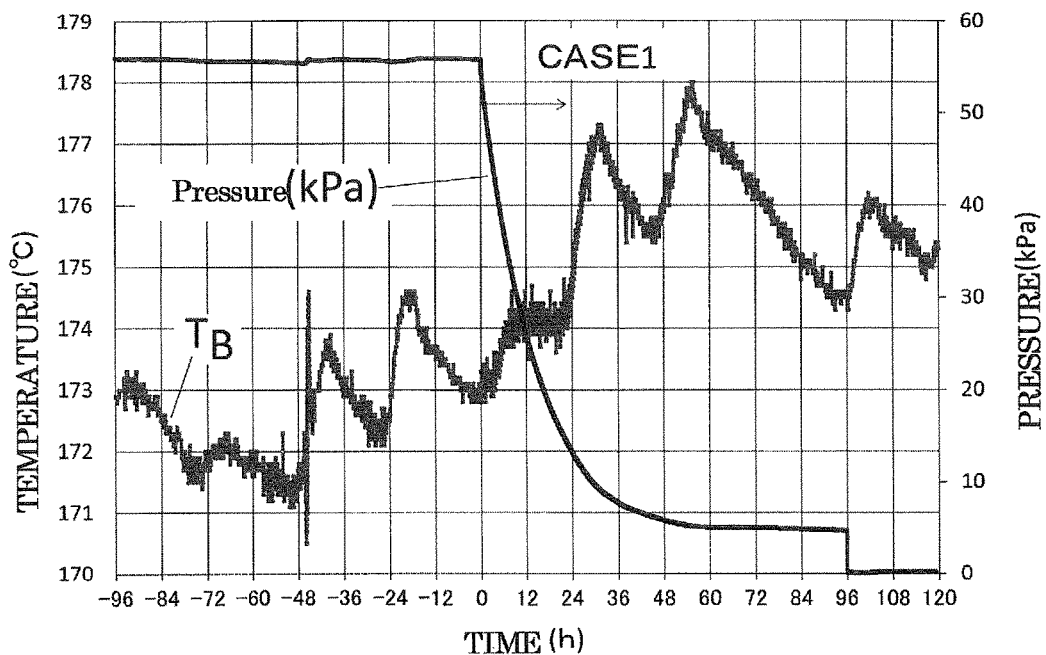
FIG. 9 is a graph illustrating change of the canister bottom portion center temperature $T_B$ relative to the inner pressure of the canister before and after helium leakage in Case 1.

In all of Cases, the canister top portion temperature $T_T$ decreased and the canister bottom portion temperature $T_B$ rose immediately after helium leakage (zero in horizontal axis is leakage start time point) (refer to FIGS. 3, 5, and 7). Furthermore, as illustrated in FIGS. 4, 6, and 8, it is found that the bottom portion of the canister 1 is largely influenced by external air as cooling air flowing from the air inlet port 7, and the canister bottom portion temperature $T_B$ changes following daily fluctuation of the feeding air temperature $T_{IN}$. Additionally, even in the case of having different structures of the concrete cask, to one degree or another, the same tendency was observed.

Meanwhile, in Case 2 in which the inner pressure of helium was set high, influence given to the canister top portion temperature $T_T$ and the canister bottom portion temperature $T_B$ by change of the inner pressure of the canister 1 due to helium leakage resulted larger compared to other Cases.

(ii) FIGS. 9 to 14 illustrate change of the canister bottom portion temperature $T_B$ in the event of gas leakage in the cases where the inner pressure of the canisters and kinds of the casks are different (zero in horizontal axis is leakage start time point). It is found that the canister bottom portion temperature $T_B$ is largely influenced by the daily fluctuation of the feeding air temperature $T_{IN}$ because of being located close to the air inlet port. Furthermore, a fluctuation range of the canister bottom portion temperature $T_B$ was about ½ of a fluctuation range of the feeding air temperature $T_{IN}$ because a temperature decayed when the temperature was transferred to a surface of the canister from the external air as the cooling air due to large thermal capacity of the canister.

(iii) Judging from the above experiment results, occurrence of some event inside the canister 1 can be grasped by monitoring only the canister bottom portion temperature $T_B$, but it is difficult to affirm with certainty that the event is helium leakage.

However, by monitoring and comparing the canister bottom portion temperature $T_B$ and the feeding air temperature $T_{IN}$, it is found that: when the helium leakage occurs from the inside of the canister 1, there is a tendency that temperature inside the canister starts rising and simultaneously a difference is generated between the canister bottom portion temperature $T_B$ and the feeding air temperature $T_{IN}$, and furthermore, the difference (relative difference) therebetween is enlarged with time, and afterward the difference is kept constant despite a fact that temperature fluctuation of the canister bottom portion temperature $T_B$ and temperature fluctuation of the feeding air temperature $T_{IN}$ substantially have overlapped each other with only slight delay before occurrence of the helium leakage (refer to FIGS. 10 and 12).

Figure 14:
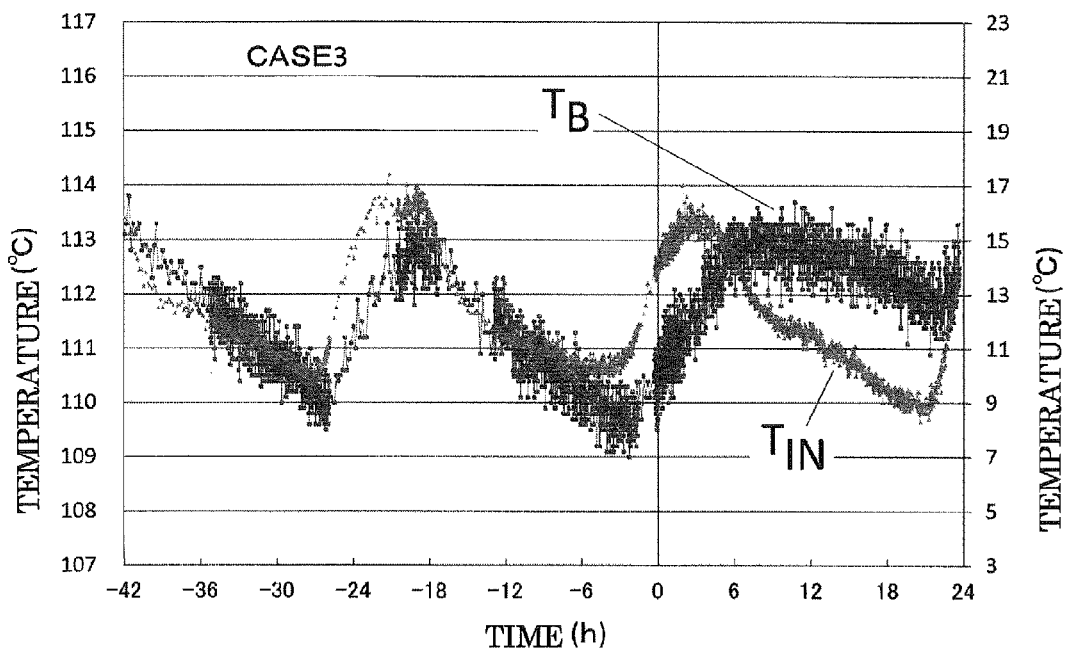
FIG. 14 is a graph illustrating a relation between the canister bottom portion center temperature $T_B$ and the feeding air temperature $T_{IN}$ before and after helium leakage in Case 3.

In other words, a factor to enlarge the difference between the canister bottom portion temperature $T_B$ and the feeding air temperature $T_{IN}$ is assumed to be helium leakage from the canister 1. The above-described tendency can also be utilized as grounded information to suspect obvious abnormal circumstances, namely, helium leakage, and as illustrated in FIG. 14, the same tendency was also observed in Case 3 using the cask having a differently-shaped flow passage. Meanwhile, in the case of adopting, for image display on a display device 25, multi-display in which average values of respective measured amounts are made the same, it is possible to visually intuitively and easily grasp, as a deviation state of a plurality of graphs, the tendency in which the differences between the two temperatures (relative difference) is enlarged. However, the image display is not limited thereto.

Therefore, by monitoring and comparing the canister bottom portion temperature $T_B$ and the feeding air temperature $T_{IN}$, for example, as illustrated in FIGS. 12 and 10, occurrence of helium leakage from the canister can be determined when the temperature difference between the two temperatures is enlarged, namely, when the temperature difference significantly fluctuates. In other words, it is found that helium leakage information is obtainable.

Meanwhile, in the experiments, the metal plate 10 having a thickness of 5 mm was provided as a metallic protection cover at the tip of the lifter 11, and a thermocouple as the first temperature sensor 13 was provided on a back surface of the metal plate 10. In this state, the canister bottom portion temperature $T_B$ was measured, avoiding directly receiving radioactive rays (y rays) from the canister bottom portion. In this case also, it was confirmed that the canister bottom portion temperature $T_B$ and the back surface temperature $T_{BI}$ of the metal plate 10 became almost the same because the metal plate 10 had excellent thermal conductivity.

Next, a description will be provided for capability of estimating occurrence of inactive gas leakage when a physical amount related to inactive gas leakage calculated by using the canister bottom portion temperature $T_B$ and the feeding air temperature $T_{IN}$ is calculated and significant change appears in this physical amount.

The above-described method of monitoring and comparing the canister bottom portion temperature $T_B$ and the feeding air temperature $T_{IN}$ is useful particularly in the case of being applied to a concrete cask in which inner pressure of the canister is high in a proper operation state, and the inner pressure of the canister is largely reduced and the canister bottom portion temperature $T_B$ largely rises in the event of gas leakage.

However, in the case where the above-described method is applied to a concrete cask in which the inner pressure inside the canister is reduced little in the event of gas leakage due to low inner pressure of the canister in the proper operation state, there may be a case where occurrence of helium leakage is hardly determined because the difference between change of the canister bottom portion temperature $T_B$ and fluctuation of the feeding air temperature $T_{IN}$ does not become enlarged. This is assumably caused by a fact the canister bottom portion temperature $T_B$ is influenced by the fluctuation of the feeding air temperature $T_{IN}$.

Therefore, preferably, such influence from the fluctuation of the feeding air temperature $T_{IN}$ is excluded from information indicating helium leakage.

Having studied the method of excluding influence from the fluctuation of the feeding air temperature $T_{IN}$, the inventor of the present invention has found that occurrence of helium leakage from the canister 1 could be determined by acquiring the physical amount related to leakage of helium as the inactive gas calculated by using data of the actual measurement temperatures of the canister bottom portion temperature $T_B$ and the feeding air temperature $T_{IN}$, for example, by acquiring the helium temperature $T_H$ at the position in the vicinity of the bottom surface inside the canister or the heat flux $q_3$ emitted from the canister bottom surface to the atmosphere under the canister bottom surface, and by monitoring change of these physical amount. This method is useful also in the case of being applied to a concrete cask in which a rising amount of the canister bottom portion temperature $T_B$ in the event of helium leakage is little.

<Case of Utilizing Helium Temperature $T_H$ at Position in Vicinity of Bottom Surface Inside Canister>

In the case of determining gas leakage utilizing the canister bottom portion temperature $T_B$, how to exclude influence from the feeding air temperature $T_{IN}$ is an important factor. Additionally, a theoretical basis of the present invention is a phenomenon in which the temperature inside the canister rises in the event of inactive gas leakage. No other reason other than occurrence of abnormality can be considered for the phenomenon, in which the temperature of the inactive gas inside the canister rises while the temperature inside the canister yearly decreases due to decrease of decay heat although gradually, except for influence of the external air temperature.

In other words, there are two possible factors for that the temperature $T_H$ of helium as the inactive gas rises: (1) helium leakage; and (2) rising of the feeding air temperature $T_{IN}$. Therefore, even when the helium temperature $T_H$ rises in the state (2) in that the feeding air temperature $T_{IN}$ rises, it is not possible to surely determine occurrence of leakage. In other words, it is not preferable to use, as a determination criterion, a condition that the feeding air temperature $T_{IN}$ and the helium temperature $T_H$ rise together, and additionally, leakage cannot be determined only by detecting rising of the helium temperature $T_H$.

On the other hand, generally, the feeding air temperature $T_{IN}$ inevitably fluctuates during the course of a day. Specifically, the feeding air temperature $T_{IN}$ rises from morning to noon and decreases from noon to night. Therefore, when occurrence of helium leakage is determined "in the case where the helium temperature $T_H$ rises while the feeding air temperature $T_{IN}$ decreases" in the course of daily fluctuation of the feeding air temperature $T_{IN}$, influence of the fluctuation of the feeding air temperature $T_{IN}$ can be excluded from the information indicating helium leakage.

In other words, in the case of utilizing, as the physical amount related to helium leakage, the helium temperature $T_H$ in the vicinity of the bottom surface inside the canister estimated from the canister bottom portion temperature $T_B$ and the feeding air temperature $T_{IN}$, occurrence of helium leakage can be determined when the tendency in which the helium temperature $T_H$ rises while the feeding air temperature $T_{IN}$ decreases is observed.

<Case of Utilizing Heat Flux $q_3$ Emitted from Canister Bottom Surface to Atmosphere Under Canister Bottom Surface>

Figure 17:
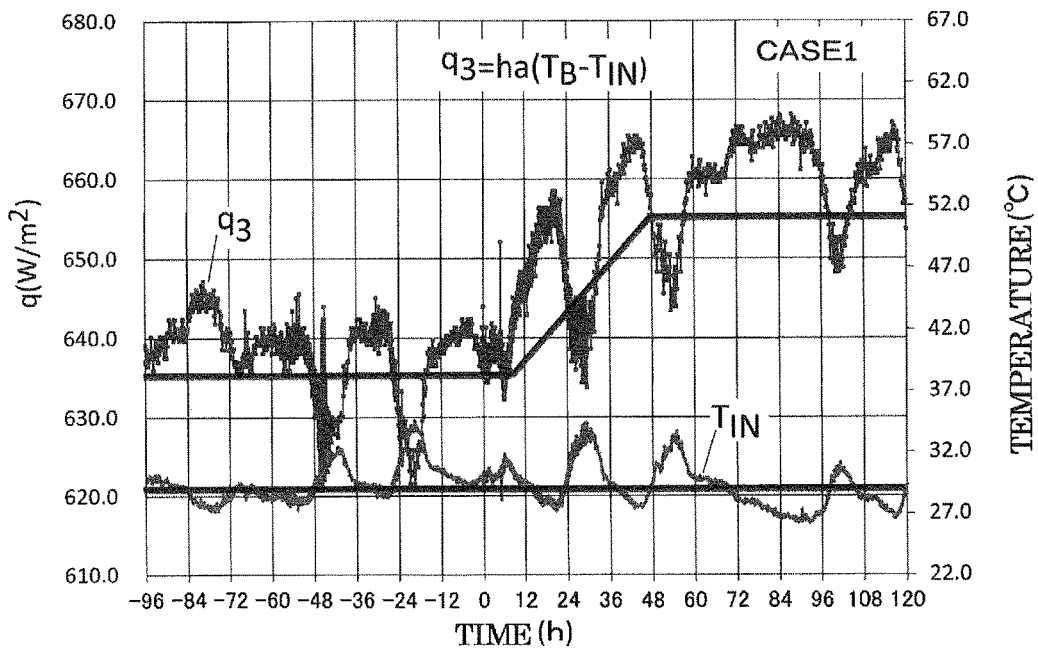
FIG. 17 is a graph illustrating change of a heat flux $q_3$ transferred from the metallic canister bottom portion to external air and the feeding air temperature $T_{IN}$ before and after helium leakage in Case 1.

According to the experiments by the inventor of the present invention, it is found that the heat flux $q_3$ emitted from the canister bottom surface to the atmosphere in the periphery, namely, to the cooling air fluctuates along with fluctuation of the feeding air temperature $T_{IN}$ as illustrated in FIG. 17, but as a general tendency, the heat flux $q_3$ starts rising while fluctuating in the event of helium leakage, and obviously becomes higher than during proper operation time before start of the helium leakage.

In other words, the phenomenon in which the heat flux obviously becomes large indicates a fact that the temperature inside the canister rose, and also provides grounds for leakage. Therefore, occurrence of helium leakage can be determined when the heat flux $q_3$ emitted from the canister bottom surface to the atmosphere under the canister bottom surface is acquired from the canister bottom portion temperature $T_B$ and the feeding air temperature $T_{IN}$, and the heat flux $q_3$ changes to become large compared to fluctuation of the feeding air temperature $T_{IN}$ as the general tendency.

Here, as for the heat flux $q_3$ emitted from the canister bottom surface to the atmosphere under the canister bottom surface, when fluctuation of the heat flux $q_3$ caused by the fluctuation of the feeding air temperature $T_{IN}$ is large, it may be difficult to determine occurrence of helium leakage. Therefore, preferably, correction is made to exclude fluctuation of the heat flux $q_3$ caused by the fluctuation of the feeding air temperature $T_{IN}$ by adding, to the heat flux $q_3$, a heat flux calculated by multiplying a fluctuation amount $\Delta T$ of the feeding air temperature $T_{IN}$ by a coefficient $\alpha$ acquired by statistical processing using data in the proper operation state. Here, $\Delta T = T_{IN} - T_{IN0}$, and $\alpha = \Phi \times h_a$. Note that $T_{IN0}$ is a reference feeding air temperature. Furthermore, $h_a$ is a heat transfer coefficient of air, and $\Phi$ is a real number.

Additionally, a principle of leakage detection using temperature information in the vicinity of the canister bottom surface will be described.

The temperature $T_H$ of helium as the inactive gas at the position in the vicinity of the bottom surface inside the canister is calculated by using the canister bottom portion temperature $T_B$ and the feeding air temperature $T_{IN}$.

Figure 15:
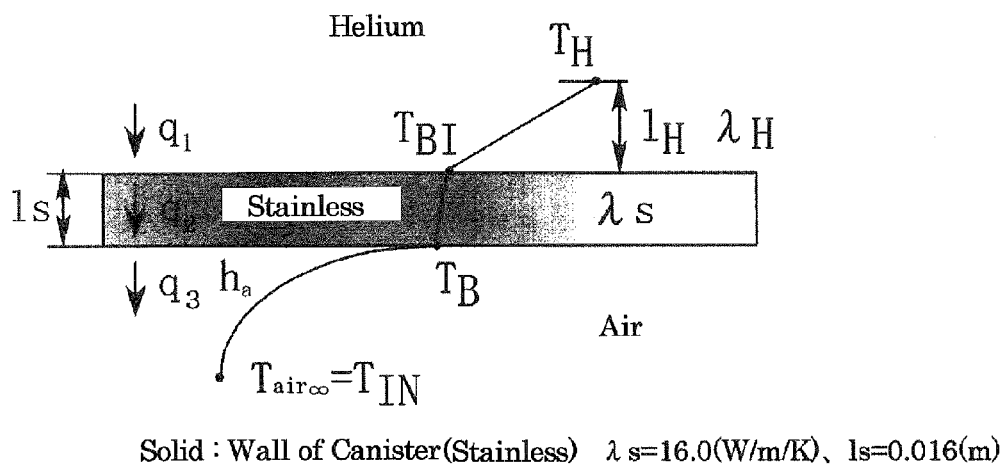
FIG. 15 is an explanatory diagram illustrating boundary conditions of a metallic canister bottom portion.

FIG. 15 illustrates a heat flow and boundary conditions. The heat flows from the inside of the canister to atmospheric air (air) via a stainless plate at the canister bottom portion. Since a heat transfer mode between the helium inside the canister and the stainless plate is uncertain, here it is assumed that heat is transferred to the stainless plate by thermal conduction. Note that $T_H$ is a helium temperature at a place distant from an inner surface of the canister bottom portion by a height $l_H$. Heat fluxes $q_1$, $q_2$, $q_3$ are expressed by following Expression 1, Expression 2, and Expression 3 respectively.

$$q_1 = \lambda_H \frac{(T_H - T_{BI})}{l_H} \qquad \text{[Expression 1]}$$

$$q_2 = \lambda_s \frac{(T_{BI} - T_B)}{l_s} \qquad \text{[Expression 2]}$$

$$q_3 = h_a(T_B - T_{IN}) \qquad \text{[Expression 3]}$$

Here, since $q_1 = q_2 = q_3$ is satisfied, Expression 4 can be acquired from Expression 1 and Expression 2.

$$\lambda_H \frac{(T_H - T_{BI})}{l_H} = \lambda_s \frac{(T_{BI} - T_B)}{l_s} \qquad \text{[Expression 4]}$$

$$T_{BI} = \frac{\frac{\lambda_H}{l_H} T_H + \frac{\lambda_s}{l_s} T_B}{\left(\frac{\lambda_H}{l_H} + \frac{\lambda_s}{l_s}\right)}$$

Expression 5 can be acquired from Expression 2 and Expression 3.

$$\lambda_s \frac{(T_{BI} - T_B)}{l_s} = h_a(T_B - T_{IN}) \qquad \text{[Expression 5]}$$

$$T_{BI} = T_B + \frac{l_s h_a}{\lambda_s}(T_B - T_{IN})$$

Therefore, Expression 6 can be acquired from Expression 4 and Expression 5.

$$T_H = \left\{1 + h_a\left(\frac{l_H}{\lambda_H} + \frac{l_s}{\lambda_s}\right)\right\}T_B - h_a\left(\frac{l_H}{\lambda_H} + \frac{l_s}{\lambda_s}\right)T_{IN} \qquad \text{[Expression 6]}$$

Meanwhile, for the heat transfer on the air side ($h_a$), a correlation equation of natural convection heat transfer of a downward-facing heated plate is used in accordance with the Heat Transfer Handbook (Japan Society of Mechanical Engineers).

Therefore, Expression 7 can be acquired.

$$Nu_a = \frac{h_a L}{\lambda_a} = 1.55 \times 1.3 \times (Gr_l \cdot Pr_a)^{1/5} \qquad \text{[Expression 7]}$$

$$h_a = \frac{\lambda_a}{L}\left(1.55 \times 1.3 \times \left(\frac{\beta g(T_B - T_{IN})L^3}{v_a^2}\right)^{1/5} Pr_a^{1/5}\right)$$

Respective symbols in Expressions 1 to 7 represent meanings as follows.

$l_H$: Distance from inner surface of canister bottom portion to observation point of helium temperature $T_H$ (m)
$l_s$: Thickness of canister bottom portion (m)
$\lambda_H$: Thermal conductivity of helium (W/m/K)
$\lambda_s$: Thermal conductivity of stainless (W/m/K)
$\lambda_a$: Thermal conductivity of air (W/m/K)
$q_1$: Heat flux from helium inside canister to inner surface of canister bottom portion (W/m²)
$q_2$: Heat flux passing canister bottom portion (W/m²)

$q_3$: Heat flux from outer surface of canister bottom portion to air (W/m²)

$h_a$: Heat transfer coefficient between outer surface of canister bottom portion and air (W/m²/K)

$T_H$: Helium temperature in vicinity of bottom surface inside canister (K)

$T_{BI}$: Temperature on inner surface of canister bottom portion (K)

$T_B$: Temperature on outer surface of canister bottom portion (K)

$T_{IN}$: Feeding air temperature (K)

$Gr_1$: Grashof number (−)

β: Thermal expansion rate of air (1/K)

$v_a$: Kinematic viscosity coefficient of air (m²/s)

g: Gravity acceleration (m/s²)

$Nu_a$: Nusselt number on air side (−)

$Pr_a$: Prandtl number of air (−)

L: Representative length (m) (The length corresponds to a canister diameter here. The canister diameter is set to 1.6 m.)

Meanwhile, the Grashof number $Gr_1$ is expressed as shown in Expression 8 below.

$$\frac{\beta g(T_B - T_{IN})L^3}{v_a^2} \quad \text{[Expression 8]}$$

Additionally, the Nusselt number on the air side $Nu_a$ is expressed as shown in Expression 9 below.

$$\frac{h_a L}{\lambda_a} \quad \text{[Expression 9]}$$

As shown in Expression 6 described above, the helium temperature $T_H$ in the vicinity of the bottom surface inside the canister is expressed by using the canister bottom portion temperature $T_B$ and the feeding air temperature $T_{IN}$. Here, the height $l_H$ from the inner surface of the canister bottom portion is an only value that can be determined optionally. Furthermore, $\lambda_H$ is also a value determined by the value of the helium temperature $T_H$, considering temperature dependency on the helium temperature $T_H$.

Here, an absolute value of the helium temperature $T_H$ is not important in the present invention, and how the helium temperature $T_H$ changes in accordance with change of the canister bottom portion temperature $T_B$ and the feeding air temperature $T_{IN}$ is important. Accordingly, the height $l_H$ from the inner surface of the canister bottom portion is assumed such that the helium temperature $T_H$ becomes a realistic value. In the study made by the inventor of the present invention, $l_H/\lambda_H$ was set so as to become 0.05.

Figure 16:
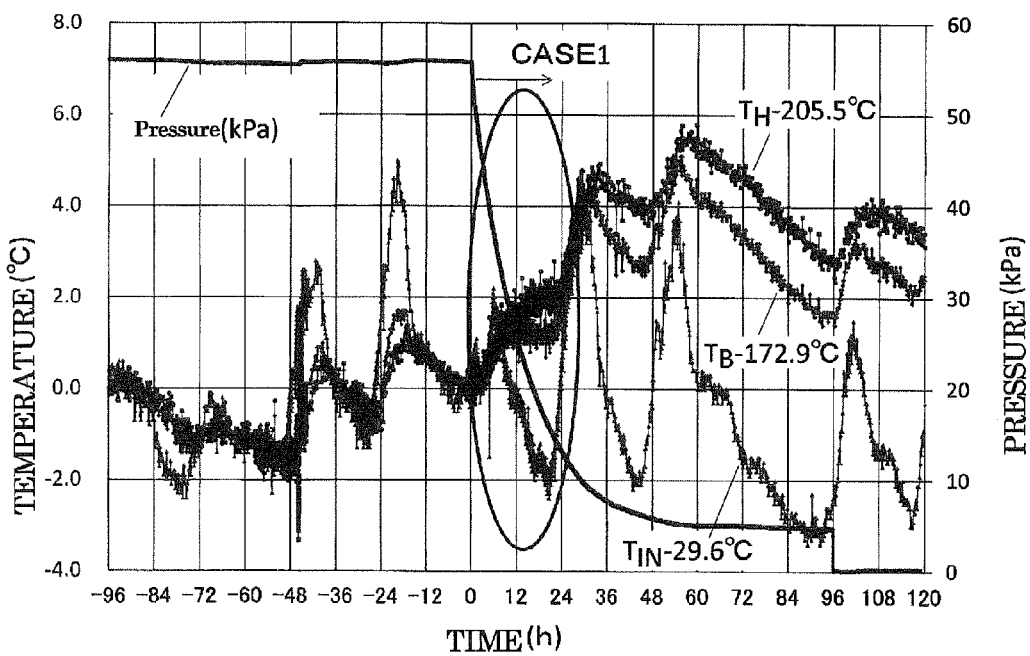
FIG. 16 is a graph illustrating fluctuation of the metallic canister bottom portion center temperature $T_B$, the feeding air temperature $T_{IN}$, and a helium temperature $T_H$ in vicinity of the bottom portion inside the canister before and after helium leakage in Case 1.

FIG. 16 illustrates a relation between the helium temperature $T_H$, the canister bottom portion temperature $T_B$, the feeding air temperature $T_{IN}$, and the inner pressure inside the canister. The helium temperature $T_H$ is acquired by calculation. The canister bottom portion temperature $T_B$, the feeding air temperature $T_{IN}$, and the inner pressure inside the canister are obtained from the tests by setting Case 1 as a target. Meanwhile, as for each of the temperatures in FIG. 16, each temperature of the temperatures during proper operation time is set to 0.0° C. as a reference temperature, and change from the reference temperature is compared. Here, "during proper operation time" means the time when gas leakage is not occurring. For example, in the experiments performed by the inventor of the present invention, a value of 96 hours before start of helium leakage was adopted, but there is no special meaning in this setting time.

Since the canister is inserted into the concrete cask after filling spent fuel and performing a sealing test, inactive gas leakage at an initial time point is impossible. Furthermore, as for an initial welding defect, there is no possibility of having an initial defect because welding test is obliged. Therefore, for example, a database of temperatures during initial proper operation time may be constructed in first several months or one year from start of storage, and afterward, the database may be updated when necessary or at a predetermined interval.

According to FIG. 16, fluctuation of the helium temperature $T_H$ follows fluctuation of the feeding air temperature $T_{IN}$ during proper operation time having no occurrence of helium leakage. In contrast, during 24 hours after about 6 hours from start of helium leakage, observed was a tendency in which the feeding air temperature $T_{IN}$ decreased while the helium temperature $T_H$ rose higher than during proper operation time (inside an ellipse in the drawing). Furthermore, after the 24 hours, a constant difference was generated between the canister bottom portion temperature $T_B$ and the feeding air temperature $T_{IN}$ and also between the helium temperature $T_H$ and the canister bottom portion temperature $T_B$.

Based on the above analysis, the inventor of the present invention has found that correlation between the canister bottom portion temperature $T_B$ and the feeding air temperature $T_{IN}$ and correlation between the helium temperature $T_H$ in the vicinity of the bottom surface inside the canister and the feeding air temperature $T_{IN}$ could be used as references to determine presence of helium leakage.

Next, FIG. 17 illustrates a relation between the heat flux $q_3$ acquired by calculation and the feeding air temperature $T_{IN}$ obtained from the tests by setting Case 1 as the target.

According to FIG. 17, the heat flux $q_3$ during proper operation time (specifically, time from −96 to 0 hours) fluctuated/s interposing about 635 W/m² corresponding to an average value during a period of proper operation time, but as the general tendency, the heat flux $q_3$ was kept constant. On the other hand, after start of leakage, the heat flux $q_3$ gradually increased and finally increased by about 20 W/m² (reached about 655 W/m²).

Based on the above analysis, the inventor of the present invention has found that change of the heat flux $q_3$ at the canister bottom surface could be used as the reference to determine presence of helium leakage.

Here, strong correlation is observed between fluctuation of the heat flux $q_3$ and fluctuation of the feeding air temperature $T_{IN}$. In other words, when the feeding air temperature $T_{IN}$ decreases, a difference from the canister bottom portion temperature $T_B$ is enlarged, a heat radiation amount increases, and the heat flux $q_3$ increases. In contrast, when the feeding air temperature $T_{IN}$ rises, the difference from the canister bottom portion temperature $T_B$ becomes little, the heat radiation amount reduces, and the heat flux $q_3$ decreases.

Figure 18:
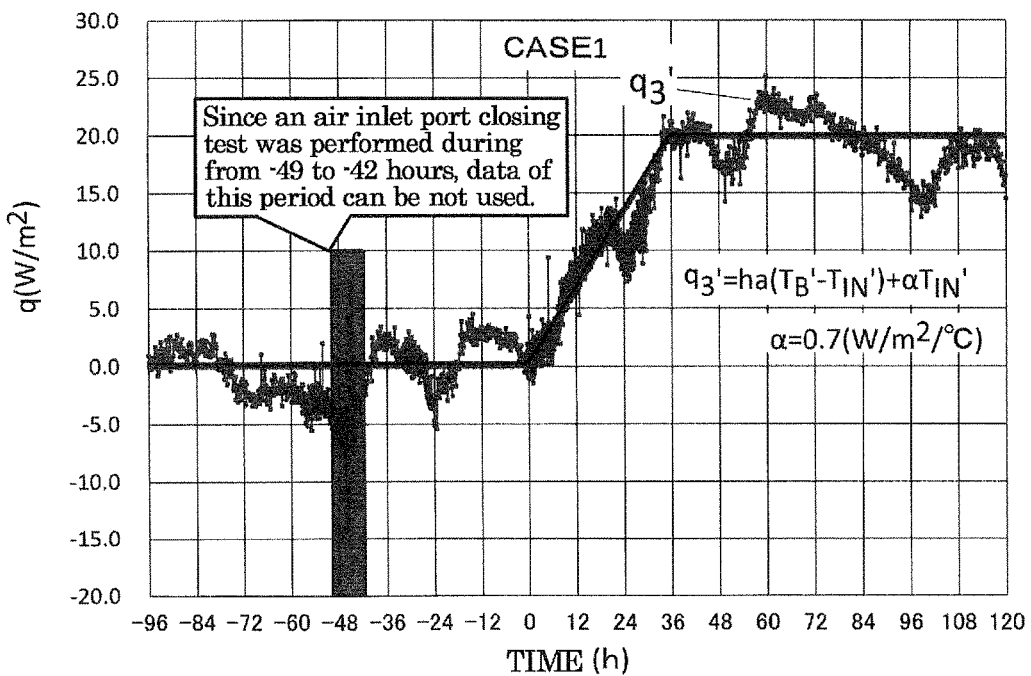
FIG. 18 is a graph illustrating a result in which influence of daily fluctuation of the feeding air temperature $T_{IN}$ is corrected based on the change of the heat flux $q_3$ transferred by heat transfer from the metallic canister bottom portion to the external air before and after helium leakage in Case 1.

Therefore, in order to exclude, from the heat flux $q_3$, the factor by fluctuation of the feeding air temperature, it is preferable to exclude fluctuation of the heat flux caused by air temperature fluctuation by adding, to the heat flux $q_3$, a heat flux calculated by multiplying the fluctuation amount ΔT of the feeding air temperature by the coefficient α. The coefficient α is not limited to a specific value and may be changed as a parameter such that an optimal value can be suitably selected. Specifically, the coefficient α may be set to about 0.7, for example. FIG. 18 illustrates fluctuation of the heat flux (heat flux fluctuation $q_3'$) acquired by this operation. According to FIG. 18, it can be confirmed that an extent of fluctuation of the heat flux caused by fluctuation of the feeding air temperature is suppressed. Furthermore, it can be grasped that the heat radiation amount from the canister bottom surface increases in a period from 0 to 36 hours as the general tendency. This is caused by a fact that the helium temperature $T_H$ in the vicinity of the bottom surface inside the canister rose. In other words, this indicates occurrence of helium leakage.

Figure 19:
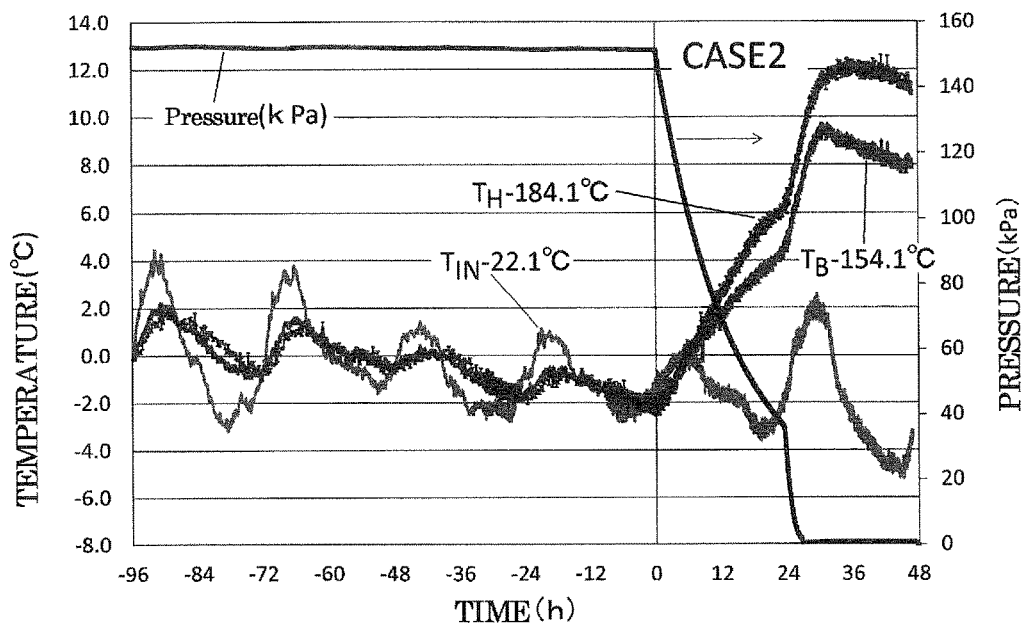
FIG. 19 is a graph illustrating fluctuation of the metallic canister bottom portion center temperature $T_B$, feeding air temperature $T_{IN}$, and helium temperature $T_H$ in the vicinity of the bottom portion inside the canister before and after helium leakage in Case 2.
Figure 20:
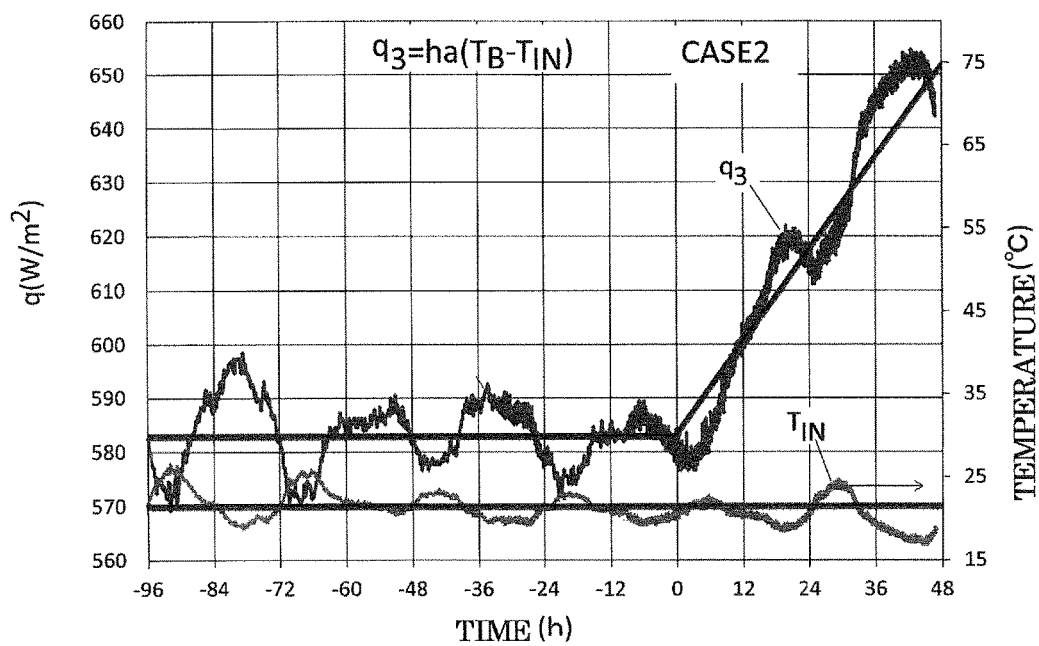
FIG. 20 is a graph illustrating change of the heat flux $q_3$ transferred from the metallic canister bottom portion to the external air and the feeding air temperature $T_{IN}$ before and after helium leakage in Case 2.
Figure 21:
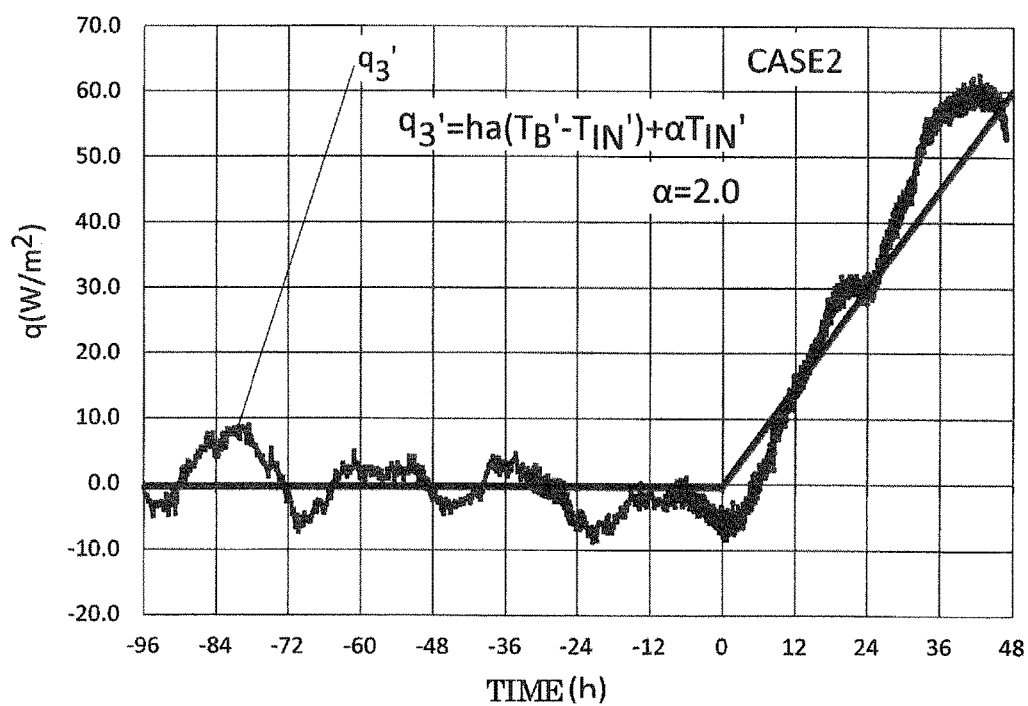
FIG. 21 is a graph in which influence of daily fluctuation of the feeding air temperature $T_{IN}$ is corrected based on the change of the heat flux $q_3$ transferred from the metallic canister bottom portion to the external air before and after helium leakage in Case 2.
Figure 22:
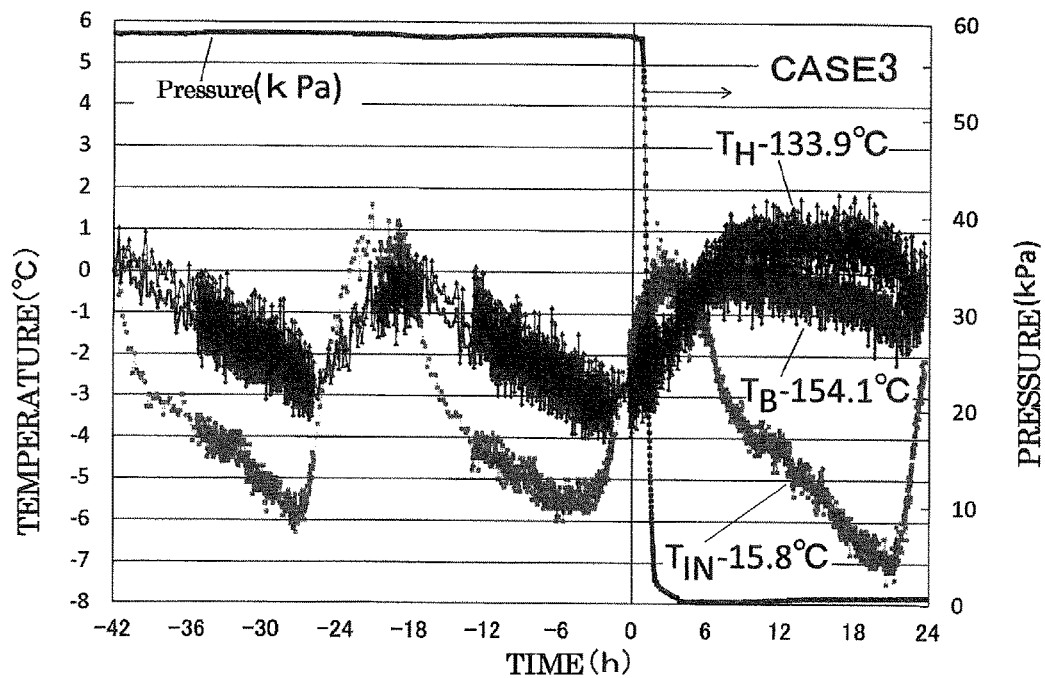
FIG. 22 is a graph illustrating fluctuation of the metallic canister bottom portion center temperature $T_B$, feeding air temperature $T_{IN}$, and helium temperature $T_H$ in the vicinity of the bottom portion inside the canister before and after helium leakage in Case 3.
Figure 23:
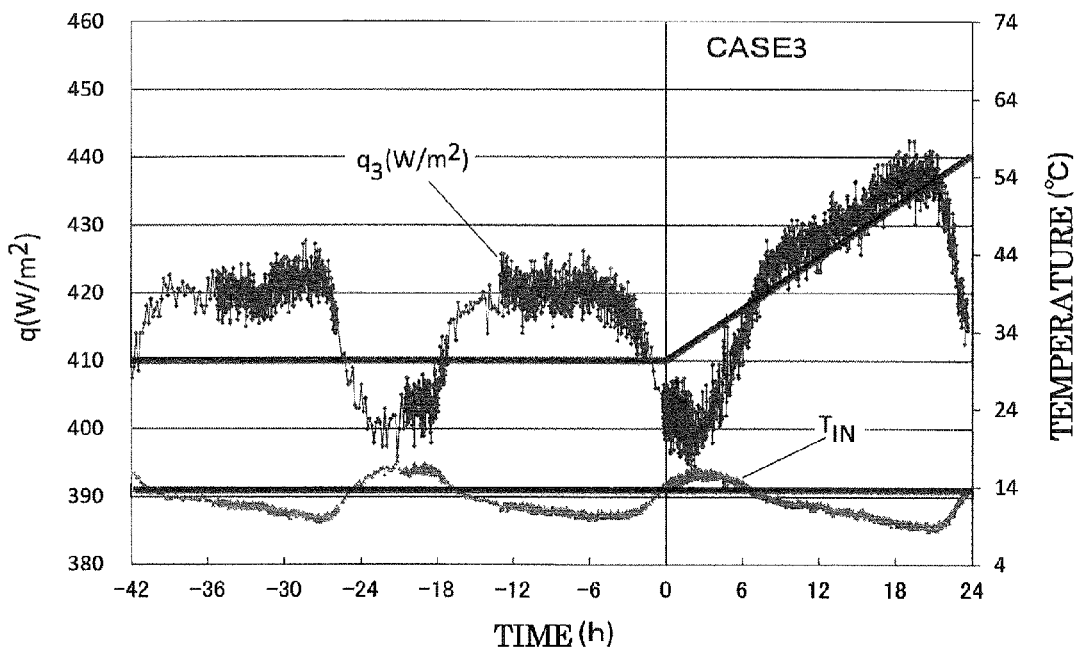
FIG. 23 is a graph illustrating change of the heat flux $q_3$ transferred from the metallic canister bottom portion to the external air and the feeding air temperature $T_{IN}$ before and after helium leakage in Case 3.
Figure 24:
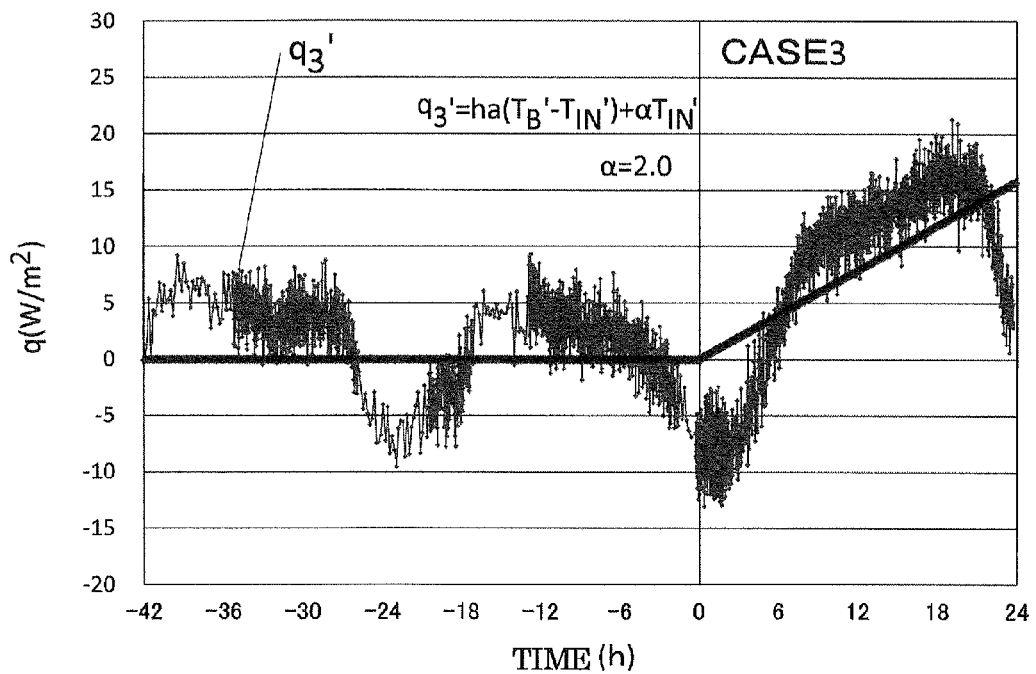
FIG. 24 is a graph in which influence of daily fluctuation of the feeding air temperature $T_{IN}$ is corrected based on the change of the heat flux $q_3$ transferred from the metallic canister bottom portion to the external air before and after helium leakage in Case 3.

The above experiment results are obtained for Case 1, but as illustrated in FIGS. 19, 20, and 21 in Case 2 and also as illustrated in FIGS. 22, 23, and 24 in Case 3, helium leakage can be determined by the helium temperature $T_H$, heat flux $q_3$, or heat flux fluctuation $q_3'$.

For example, according to FIGS. 19 and 22, it can be grasped that a tendency in which the helium temperature $T_H$ rises while the feeding air temperature $T_{IN}$ decreases after helium leakage and a tendency in which the difference between the feeding air temperature $T_{IN}$, canister bottom portion temperature $T_B$, and helium temperature $T_H$ is enlarged are the same as Case 1.

Additionally, FIGS. 21 and 24 illustrate the heat flux radiated from the canister bottom portion, specifically, the heat flux excluding the heat flux caused by fluctuation of the feeding air temperature accompanying the air temperature fluctuation. According to FIGS. 21 and 24, it can be grasped that the heat flux increases after helium leakage same as Case 1.

Meanwhile, in Case 2, change of the inner pressure is larger and change of the temperature and change of the heat flux are larger compared to Case 1.

Based on the above results, validation of detecting helium leakage by the helium temperature $T_H$, heat flux $q_3$, or heat flux fluctuation $q_3'$ is verified.

Next, a description will be provided for an embodiment of an apparatus for detecting gas leakage in which the method of detecting helium leakage according to the above-described present invention is applied.

First, a description will be provided for an example in which a helium temperature $T_H$ at a position in the vicinity of a bottom surface inside the canister is utilized as a physical amount related to helium leakage calculated by using a canister bottom portion temperature $T_B$ and a feeding air temperature $T_{IN}$.

Here, the apparatus for detecting gas leakage may be formed by a dedicated device including respective units to execute predetermined processing, or may be implemented by a computer executing a program.

Figure 25:
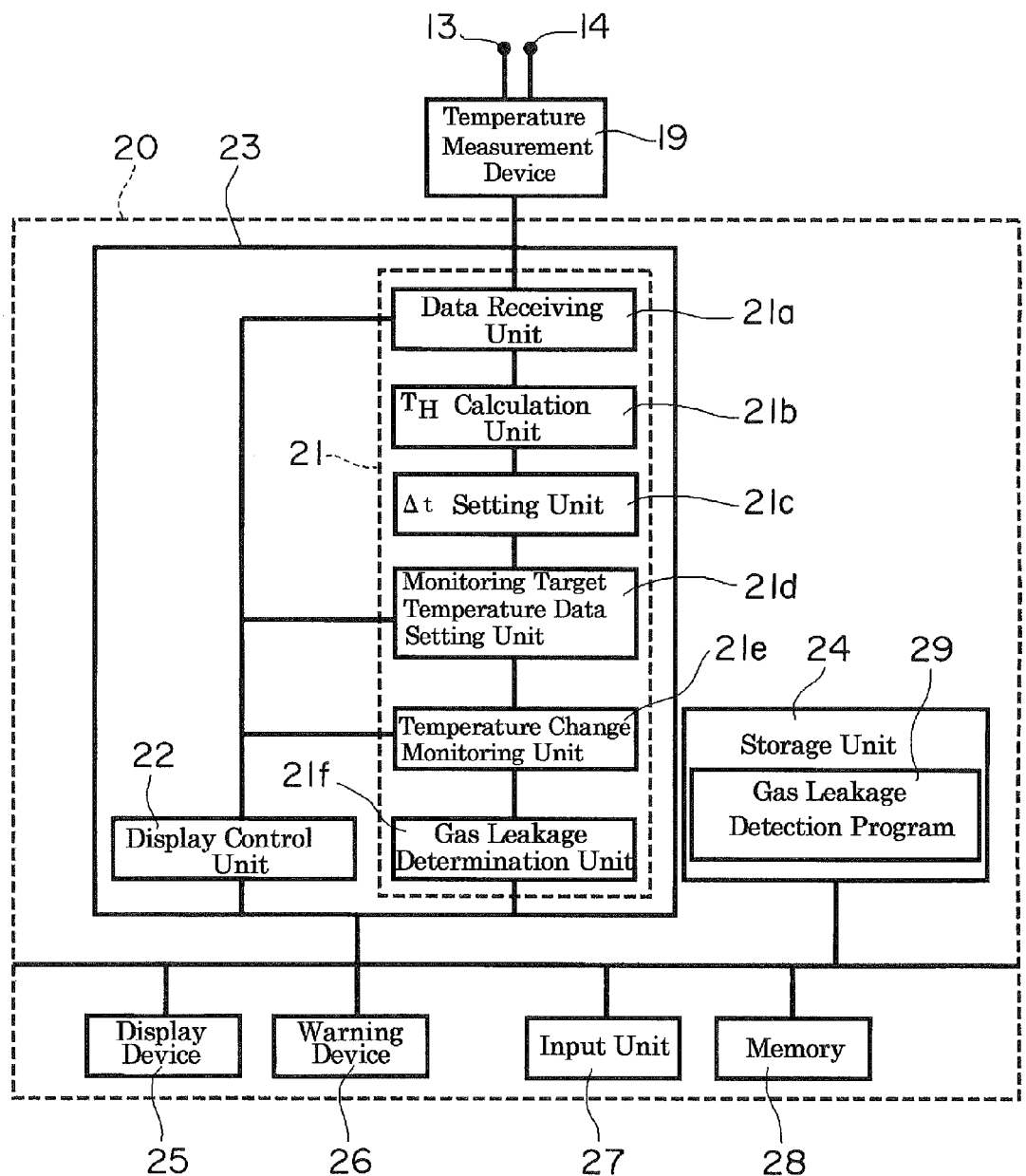
FIG. 25 is a functional block diagram illustrating an embodiment of the apparatus for detecting gas leakage from a radioactive material sealed container according to the present invention.

For example, in an example illustrated in FIG. 25, a gas leakage detection program 29 stored in a storage unit 24 is executed, thereby implementing the apparatus for detecting gas leakage by a computer 20. However, the apparatus for detecting gas leakage may also be formed as the dedicated device 20 including respective units such as a data receiving unit 21a and the like to execute predetermined processing, a display control unit 22, and so on.

The apparatus for detecting gas leakage according to the present embodiment implements a gas leakage estimation unit 21 including: the data receiving unit 21a adapted to read a canister bottom portion temperature $T_B$ and a feeding air temperature $T_{IN}$ from a temperature measurement device 19 including a first temperature sensor 13 and a second temperature sensor 14; a helium temperature calculation unit 21b adapted to calculate a helium temperature $T_H$ in vicinity of a bottom surface inside a canister by using the canister bottom portion temperature $T_B$ and the feeding air temperature $T_{IN}$; a $\Delta t$ setting unit 21c adapted to set a temperature monitoring time interval $\Delta t$; a monitoring target temperature data setting unit 21d adapted to set respective monitoring target data; a temperature change monitoring unit 21e adapted to monitor change of the helium temperature $T_H$ and the feeding air temperature $T_{IN}$; and a gas leakage determination unit 21f adapted to determine gas leakage when the helium temperature $T_H$ rises although the feeding air temperature $T_{IN}$ decreases.

Additionally, the apparatus for detecting gas leakage according to the present embodiment includes the display control unit 22 adapted to constantly display, on the display device 25, the change of the helium temperature $T_H$ and the feeding air temperature $T_{IN}$ which are the monitoring target data. Note that reference sign 23 in the drawing indicates a control unit (central processing device), reference sign 26 a warning device, reference sign 27 an input unit, and reference sign 28 a memory respectively.

Meanwhile, displaying measured temperature change is a function which can be implemented by using a monitor of an existing data logger without relying on particular arithmetic processing by a computer, and also such a display can be easily achieved by installing software bundled with the data logger in a personal computer. Additionally, switching screen display is a general function which can be easily executed by using a commercially available data logger monitor or by the software bundled to the data logger and installed in the personal computer.

Figure 26:
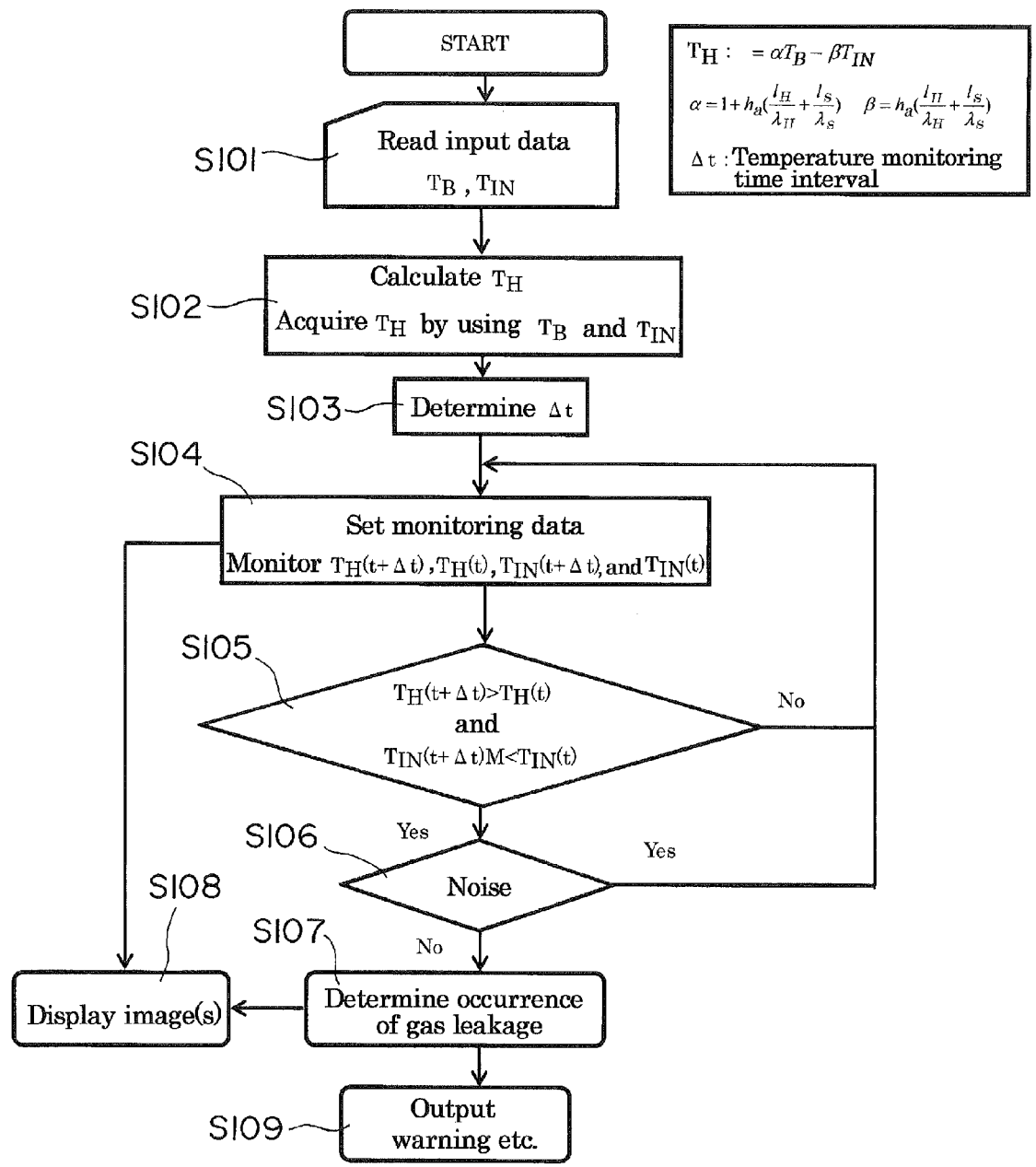
FIG. 26 is a flowchart illustrating an embodiment of an apparatus and a method for detecting gas leakage from a radioactive material sealed container according to the present invention.

In the following, a processing procedure in the apparatus for detecting gas leakage according to the present embodiment will be described based on a flowchart illustrated in FIG. 26.

First, the canister bottom portion temperature $T_B$ and the feeding air temperature $T_{IN}$ detected by the first and second temperature sensors 13, 14 are read from the temperature measurement device 19 (Step 101).

Next, the helium temperature $T_H$ in the vicinity of the bottom surface inside the canister is calculated by using the canister bottom portion temperature $T_B$ and the feeding air temperature $T_{IN}$ (Step 102). For example, the helium temperature $T_H$ is calculated by a computer executing arithmetic processing of Expression 6 described above.

The temperature monitoring time interval $\Delta t$ is set (Step 103). Here, the temperature monitoring time interval $\Delta t$ is a value optionally determined, however; since fluctuation of the feeding air temperature $T_{IN}$ within 24 hours is utilized in the method of determining leakage according to the present embodiment, setting the temperature monitoring time interval $\Delta t$ to 24 hours is meaningless, and it is preferable to set a time such as 1 hour or 2 hours during which measurement data of daily fluctuation of the feeding air temperature $T_{IN}$ can be provided.

Setting for monitoring data and monitoring the same are performed (Step 104). The monitoring data corresponds to the above-described helium temperature $T_H$ and the feeding air temperature $T_{IN}$, and a helium temperature $T_H$ (t) and a feeding air temperature $T_{IN}$ (t) at a time t, and a helium temperature $T_H$ (t+$\Delta t$) and a feeding air temperature $T_{IN}$ (t+$\Delta t$) after the temperature monitoring time interval $\Delta t$ are monitored.

Then, comparison is made on fluctuation of these temperatures from the time t to the time after the temperature monitoring time interval $\Delta t$ has passed. In other words, whether the above-described helium temperature $T_H$ satisfies a relation "$T_H$ (t+$\Delta t$)>$T_H$ (t)" and also whether the feeding air temperature $T_{IN}$ satisfies a relation "$T_{IN}$ (t+$\Delta t$)<$T_{IN}$ (t)" are constantly monitored (Step 105).

In the case where the above relation is satisfied, whether such a relation is a temporary phenomenon like noise is checked (Step 106).

Whether noise or not is determined by, for example, whether there is a predetermined temperature difference compared to previous and subsequent data in the case where unusual data is observed. Specifically, when there is the predetermined temperature difference, it is determined as noise. Since noise can be removed also by changing a sampling time, Step 106 is not needed in this case.

Furthermore, in monitoring by the display device 25, noticeable data shaped like a whisker as illustrated in the graph of FIG. 18 can be easily determined as noise.

On the other hand, the helium temperature $T_H$ (t) and the feeding air temperature $T_{IN}$ (t) at the time t and the helium temperature $T_H$ (t+Δt) and the feeding air temperature $T_{IN}$ (t+Δt) after the temperature monitoring time interval Δt, which are the monitoring data, are simultaneously displayed as an image on the display device 25 (Step 108) and made available for monitoring as an item of daily inspection work of a worker.

In monitoring the display device 25, when rising of the helium temperature $T_H$ is observed despite decrease of the feeding air temperature $T_{IN}$ as illustrated in FIG. 16, the worker can visually and intuitively determine that obvious abnormal circumstances, namely, occurrence of gas leakage. In other words, the above tendency can be used as grounds/information to determine helium leakage.

In the case where the above-described relations are not satisfied in Step 105 and in the case where determination as noise is made in Step 106, the process returns to the processing in Step 104 and monitoring for the monitoring data is continued.

Furthermore, in the case where determination is made not as noise in Step 106, it is determined as helium leakage (Step 107). In this case, a warning sound, a warning message, and the like are output by the warning device 26 or the display device 25 (Steps 108 and 109).

In other words, occurrence of leakage of the inactive gas (helium) is determined when the helium temperature $T_H$ in the vicinity of the bottom surface inside the canister is estimated from the canister bottom portion temperature $T_B$ and the feeding air temperature $T_{IN}$ and the tendency in which the helium temperature $T_H$ rises despite decrease of the feeding air temperature $T_{IN}$ is observed.

Next, a description will be provided for an embodiment of an apparatus for detecting gas leakage in which a heat flux $q_3$ emitted from a canister bottom surface to air is utilized as a physical amount related helium leakage calculated by using a canister bottom portion temperature $T_B$ and a feeding air temperature $T_{IN}$ which are measured.

The apparatus for detecting gas leakage according to the present embodiment is adapted to consider fluctuation of the feeding air temperature $T_{IN}$.

Here, the apparatus for detecting gas leakage may be formed by a dedicated device including respective units to execute predetermined processing, or may be implemented by a computer executing a program.

Figure 27:
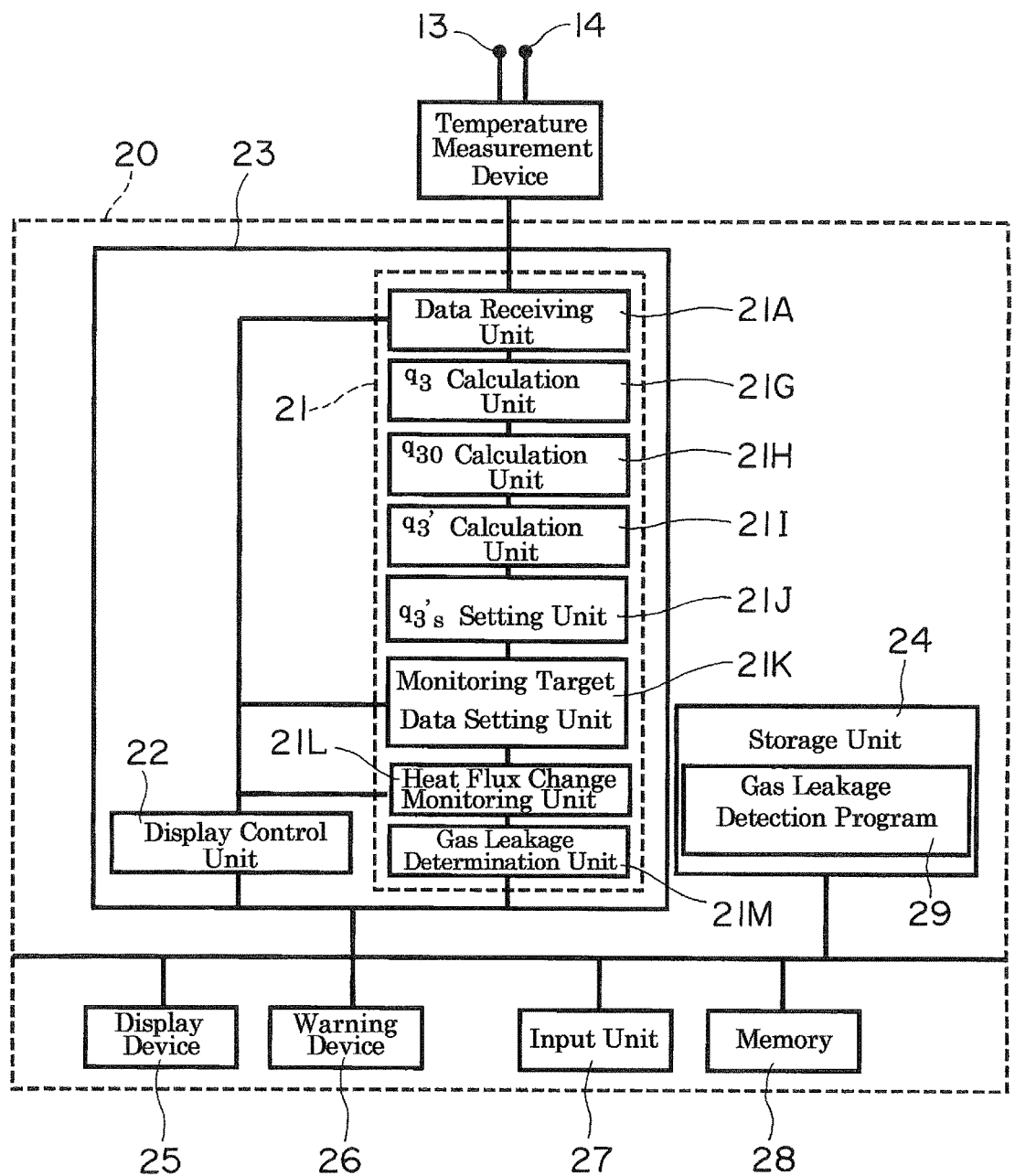
FIG. 27 is a functional block diagram illustrating another embodiment of the apparatus for detecting gas leakage from a radioactive material sealed container according to the present invention.

For example, in an example illustrated in FIG. 27, a gas leakage detection program 29 stored in a storage unit 24 is executed, thereby implementing the apparatus for detecting gas leakage by a computer 20. However, the apparatus for detecting gas leakage may also be formed as the dedicated device 20 including respective units such as a data receiving unit 21a and the like to execute predetermined processing, a display control unit 22, and so on.

The apparatus for detecting gas leakage of the present embodiment implements a gas leakage estimation unit 21 including: a data receiving unit 21A adapted to read the canister bottom portion temperature $T_B$ and the feeding air temperature $T_{IN}$ from a temperature measurement device 19 including a first temperature sensor 13 and a second temperature sensor 14; a heat flux calculation unit 21G adapted to calculate the heat flux $q_3$ transferred to external air from the canister bottom portion by using the canister bottom portion temperature $T_B$, the feeding air temperature $T_{IN}$, and a heat transfer coefficient $h_a$ on the air side; a reference heat flux calculation unit 21H adapted to calculate a heat flux $q_{30}$ (reference heat flux $q_{30}$) during proper operation time within a monitoring period t; a heat flux fluctuation calculation unit 21I adapted to calculate heat flux fluctuation $q_3'$ in which influence of fluctuation of the feeding air temperature $T_{IN}$ is excluded from the heat flux $q_3$; a threshold heat flux calculation unit 21J adapted to calculate a threshold heat flux fluctuation $q_3'_s$ to determine gas leakage based on an initial inner pressure of the canister and a heat generation amount during the monitoring period; a monitoring target data setting unit 21K adapted to set the heat flux fluctuation $q_3'$ as a monitoring target for monitoring change thereof; a heat flux change monitoring unit 21L adapted to monitor change of the heat flux fluctuation $q_3'$; and a gas leakage determination unit 21M adapted to determine gas leakage when the heat flux fluctuation $q_3'$ becomes larger than the threshold heat flux fluctuation $q_3'_s$.

Additionally, the apparatus for detecting gas leakage according to the present embodiment includes the display control unit 22 adapted to constantly display, on the display device 25, the heat flux fluctuation $q_3'$ that is the monitoring target data. Note that reference sign 23 in the drawing indicates a control unit (central processing device), reference sign 26 a warning device, reference sign 27 an input unit, and reference sign 28 a memory respectively.

Here, since decay heat of spent fuel inside the canister is reduced with age, the helium temperature $T_H$ inside the canister decreases even without occurrence of helium leakage. Due to this, the canister bottom portion temperature $T_B$ also decreases. Temperature decrease inside the canister caused by reduction of the decay heat with age has a small decrease rate but may become a factor of erroneous determination in the case where leakage is little. Therefore, preferably, the temperature decrease inside the canister caused by reduction of the decay heat is discriminated.

Accordingly, in the present invention, the temperature decrease with age due to reduction of the decay heat is preferably considered as an allowable value.

For example, determination is preferably made by setting a data review period $t_0$, reviewing the reference heat flux $q_{30}$ in every review period $t_0$, and recalculating the threshold heat flux fluctuation $q_3'_s$ to determine gas leakage. Since the data review period $t_0$ is derived from decrease of the heat generation amount caused by reduction of the decay heat, preferably, the data review period $t_0$ is a period such as one year or two years in which decrease of the heat generation amount can be obviously observed.

Figure 28:
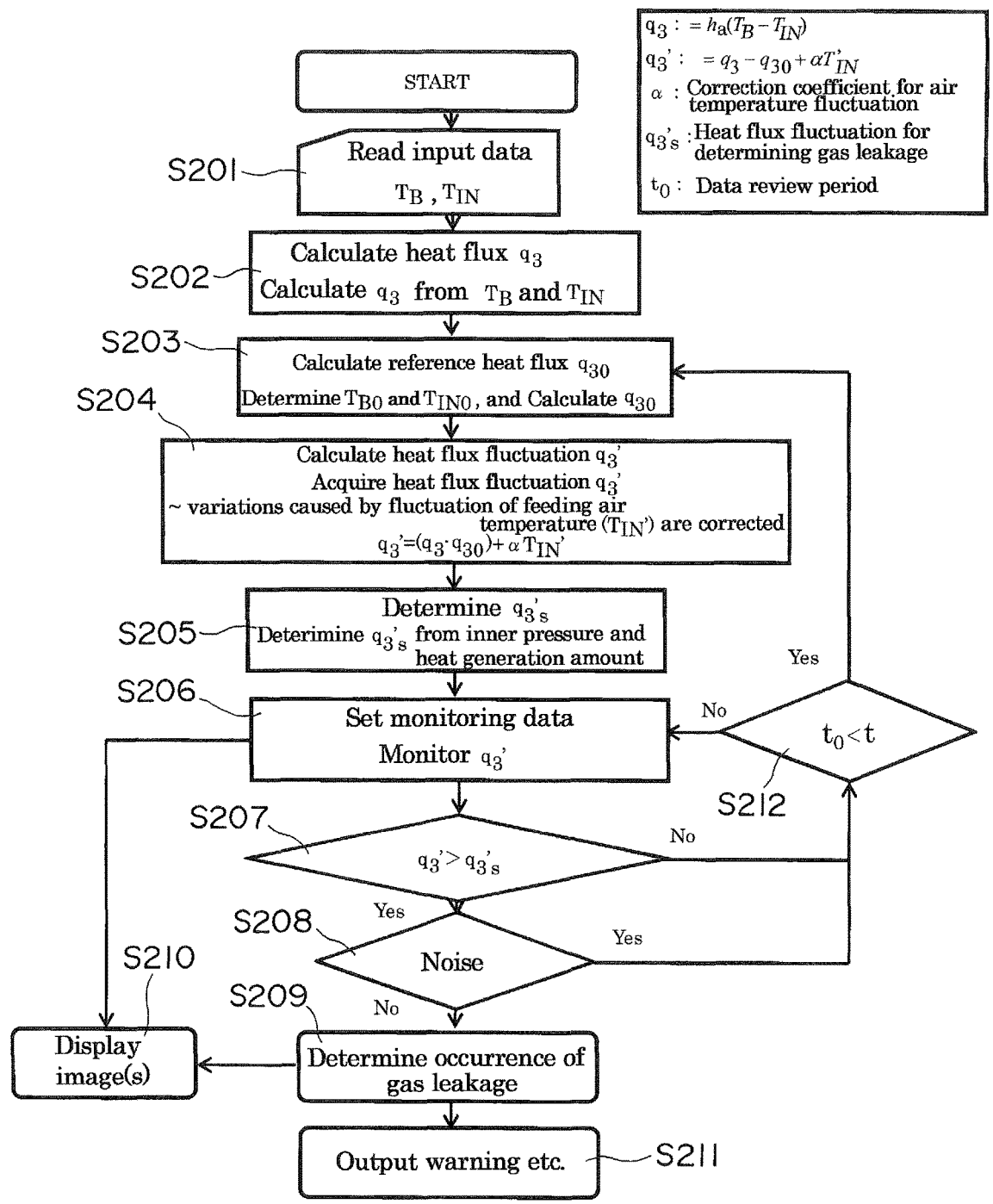
FIG. 28 is a flowchart illustrating another embodiment of an apparatus and a method for detecting gas leakage from a radioactive material sealed container according to the present invention.

In the following, a processing procedure of gas leakage monitoring and leakage determination utilizing the heat flux $q_3$ emitted from the canister bottom surface to air in the apparatus for detecting gas leakage of the present embodiment will be described based on a flowchart illustrated in FIG. 28.

First, the canister bottom portion temperature $T_B$ and the feeding air temperature $T_{IN}$ detected by the first and second temperature sensors 13 and 14 are read from the temperature measurement device 19 (Step 201).

Next, the heat flux $q_3$ transferred from the canister bottom portion to external air is calculated by using the canister bottom portion temperature $T_B$, feeding air temperature $T_{IN}$, and heat transfer coefficient $h_a$ on the air side (Step 202). For example, the heat flux $q_3$ is calculated by a computer executing arithmetic processing in Expression 3. Here, the heat transfer coefficient $h_a$ on the air side is calculated based on Expression 7 described above.

Next, the reference heat flux $q_{30}$ at a certain time point in a proper operation state after start of monitoring is determined (Step 203). A reference canister bottom portion temperature $T_{B0}$ and a reference feeding air temperature $T_{IN0}$ during proper operation time are determined, and the reference heat flux $q_{30}$ is calculated. Unless otherwise gas leakage occurs, temperatures such as the canister bottom portion temperature $T_B$ and the feeding air temperature $T_{IN}$ are considered to daily fluctuate while keeping a constant temperature difference therebetween. Therefore, an appropriate time during monitoring is determined, and a heat flux is calculated by setting each of the temperatures at the time as a reference point, and the calculated heat flux may be set as the reference heat flux. The time is optional, and for example, in experiments performed by the inventor of the present invention, a value of 96 hours before start of helium leakage was adopted, but there is no special meaning in this setting time.

Furthermore, the heat flux fluctuation $q_3'$ in which variations caused by fluctuation of the feeding air temperature are corrected is acquired (Step 204). In the present embodiment, for example, $q_3'=(q_3-q_{30})+\alpha T_{in}'$ is calculated to acquire the heat flux fluctuation $q_3'$.

Furthermore, the heat flux fluctuation $q_3'_s$ is determined as a threshold to determine helium leakage based on an initial canister confining inner pressure (specifically, value measured at the time of He substitution after spent fuel is stored) and a heat generation amount of the spent fuel during the monitoring period (Step 205).

Here, when a storage period and a kind of the spent fuel are known, the heat generation amount can be obtained by calculating decay heat thereof with an analysis code.

In the present embodiment, utilized is a fact that rising of the temperature inside the canister, namely, occurrence of helium leakage can be determined in the case of detecting significant rising of the heat flux in which the heat flux $q_3$ obviously becomes large. Therefore, some kind of comparison reference/threshold heat flux fluctuation $q_3'_s$ are needed in order to determine "heat flux $q_3$ obviously becomes large".

Here, since the heat flux is largely influenced by fluctuation of the feeding air temperature $T_{IN}$, processing to accumulate data during proper operation time and preliminarily consider influence of the feeding air temperature $T_{IN}$ is needed for calculation of the threshold heat flux fluctuation $q_3'_s$. For example, such processing is to add, to a fluctuation amount $\Delta T$ of the feeding air temperature, a value obtained by multiplying a predetermined correction coefficient $\alpha$, and a state as illustrated in FIG. 18 is obtained.

In this graph, a threshold is set to, for example, +15.0 W/m² with an allowable range of ±5.0 W/m² for a fluctuation range of the heat flux, and in the case where the heat flux exceeds the threshold, it can be determined as leakage. Needless to mention, this threshold is not limited to the above-described value and varied by an initial inner pressure. For example, in the case where the initial inner pressure like a CFS canister of Case 2 is set to 1.5 atmospheric pressure, higher than that of the CFS canister of Case 1, the allowable range may be set to ±10.0 W/m² and the threshold may be set to +30.0 W/m².

Subsequently the heat flux fluctuation $q_3'$ is set as monitoring data, and the heat flux fluctuation $q_3'$ is monitored (Step 206). Then, as quantitative determination, whether $q_3'>q_3'_s$ is satisfied is constantly monitored (Step 207).

In the case where this relation is satisfied, whether such a relation is a temporary phenomenon like noise is checked (Step 208). Determining whether noise or not in the case where any unusual data appears is performed by comparing the data with previous data and subsequent data thereof and determining whether there is a predetermined temperature difference therebetween. Specifically, when there is the predetermined temperature difference, it is determined as noise.

For example, unusual data like a whisker observed in the graph of the heat flux fluctuation $q_3'$ exemplified in FIG. 18 can be easily determined as noise. Additionally, noise can be removed also by changing a sampling time. Therefore, in this case, this Step 208 is not needed.

On the other hand, the heat flux fluctuation $q_3'$ that is the monitoring data is simultaneously displayed as an image on the display device 25 (Step 210), and made available for monitoring as an item of daily inspection work of a worker. In monitoring the display device 25, when rising of the heat flux fluctuation $q_3'$ is observed as illustrated in FIG. 18, the worker can visually and intuitively determine that obvious abnormal circumstances, namely, occurrence of gas leakage. In other words, it can be used as grounds/information to determine helium leakage.

Here, in the case where the relation $q_3'>q_3'_s$ is not satisfied, or in the case where it is determined as noise although the relation is satisfied, whether a monitoring period t is longer than a data review period $t_0$ is confirmed (Step 212). In the case where the monitoring period t is shorter than the data review period $t_0$, it is determined as "No Abnormality", and the process returns to the processing in Step 206 and monitoring is continued.

On the other hand, in the case where the monitoring period t is longer than the data review period $t_0$, the processing returns to the processing in Step 203. In other words, after the data review period $t_0$ has passed, latest proper operation time temperature data is read from a proper operation time temperature database periodically updated since start of storage, the reference canister bottom portion temperature $T_{B0}$ and the reference feeding air temperature $T_{IN0}$ during proper operation time are reviewed, and the reference heat flux $q_{30}$ is recalculated (Step 203), the heat flux fluctuation $q_3'$ is recalculated (Step 204), the threshold heat flux fluctuation $q_3'_s$ is determined again (Step 205), and the resetting/monitoring for the monitoring data $q_3'$ is continued (Step 206).

On the other hand, when determination is made not as noise, it is determined as leakage (Step 209). In this case, a warning sound, a warning message, and the like are output by the warning device 26 or the display device 25 (Steps 210 and 211). At this point, a message of "gas leakage" may also be announced on the display device 25 in a manner overlapping the heat flux fluctuation $q_3'$ that is the monitoring data.

Meanwhile, the above-described embodiments are examples of preferable implementation of the present invention, but the present invention is not limited thereto, and various modifications can be made within a scope without departing from the gist of the present invention.

For example, the description has been mainly given for the examples in which the helium temperature $T_H$ and the feeding air temperature $T_{IN}$, or the heat flux fluctuation $q_3'$ are adopted as the monitoring data in the above-described embodiments, but not limited thereto, measured temperature data of the first temperature sensor 13 and the second temperature sensor 14 output from the temperature measurement device 19 may be obtained, and gas leakage may be detected by adopting, as the monitoring data, the canister bottom portion temperature $T_B$ and the feeding air temperature $T_{IN}$. In this case, occurrence of inactive gas leakage can be determined when the following tendency is observed: the canister bottom portion temperature $T_B$ starts rising and also a difference between the canister bottom portion temperature $T_B$ and the feeding air temperature $T_{IN}$ is generated, and then the difference (relative difference) is enlarged with time, and afterward the difference is kept constant.

Meanwhile, as a gas leakage detection system, only an alarm may be issued when conditions that a computer determines as leakage is satisfied, but as a safe measure as the detection system, real time monitoring for measured temperatures in time-series is preferably provided in terms of confirming no abnormality. In other words, needless to mention, a configuration may be made such that change of the canister bottom portion temperature $T_B$ and the feeding air temperature $T_{IN}$ is displayed as an image on the display device 25, a message is displayed when determined as gas leakage, or the computer 20 is made to execute various kinds of alarm actions such as an alarm sound and an alarm light emission.

What is claimed is:

1. A method for detecting gas leakage from a radioactive material sealed container, adapted to detect leakage of inactive gas from a metallic sealed container of the radioactive material sealed container that includes: the metallic sealed container configured to store and seal spent fuel and the inactive gas; and a non-sealed concrete-made storage container having a shielding function and configured to store the metallic sealed container, the method comprising:
    measuring a temperature at a bottom portion of the metallic sealed container;
    also measuring a feeding air temperature of external air passing between the metallic sealed container and the concrete-made storage container; and
    determining occurrence of leakage of the inactive gas when significant change appears in correlation between the temperature at the bottom portion of the metallic sealed container and the feeding air temperature or when change appears in a physical amount related to leakage of the inactive gas calculated by using the temperature at the bottom portion of the metallic sealed container and the feeding air temperature.

2. The method for detecting gas leakage from a radioactive material sealed container according to claim 1, wherein
    the physical amount is a temperature of the inactive gas in vicinity of a bottom surface inside the metallic sealed container,
    the temperature of the inactive gas is calculated from the temperature at the bottom portion of the metallic sealed container and the feeding air temperature, and
    when the temperature of the inactive gas rises while the feeding air temperature decreases, occurrence of leakage of the inactive gas is determined.

3. The method for detecting gas leakage from a radioactive material sealed container according to claim 1, wherein the physical amount is a heat flux emitted from the bottom portion of the metallic sealed container to the external air,
    a heat flux is calculated by multiplying a heat transfer coefficient at a bottom surface of the metallic sealed container by a difference between the temperature at the bottom portion of the metallic sealed container and the feeding air temperature, and
    when fluctuation of the heat flux is larger than threshold heat flux fluctuation, occurrence of leakage of the inactive gas is determined.

4. The method for detecting gas leakage from a radioactive material sealed container according to claim 3, wherein a fluctuation amount of the heat flux caused by fluctuation of the feeding air temperature is excluded by adding, to the heat flux, a heat flux calculated by multiplying a coefficient $\alpha$ by the fluctuation amount of the feeding air temperature.

5. The method for detecting gas leakage from a radioactive material sealed container according to claim 1, wherein the temperature at the bottom portion of the metallic sealed container is a temperature at a bottom portion center of the metallic sealed container.

6. An apparatus for detecting gas leakage from a radioactive material sealed container, adapted to detect leakage of inactive gas from a metallic sealed container of the radioactive material sealed container that includes: the metallic sealed container configured to store and seal spent fuel and the inactive gas; and a non-sealed concrete-made storage container having a shielding function and configured to store the metallic sealed container, the apparatus comprising:
    a first temperature sensor configured to measure a temperature at a bottom portion of the metallic sealed container;
    a second temperature sensor configured to measure a feeding air temperature of external air passing between the metallic sealed container and the concrete-made storage container; and
    a gas leakage estimation unit configured to estimate occurrence of leakage of the inactive gas when significant change appears in correlation between the temperature at the bottom portion of the metallic sealed container and the feeding air temperature or when change appears in a physical amount related to leakage of the inactive gas calculated by using the temperature at the bottom portion of the metallic sealed container and the feeding air temperature.

7. The apparatus for detecting gas leakage from a radioactive material sealed container according to claim 6, wherein
    the physical amount is a temperature of the inactive gas in vicinity of a bottom surface inside the metallic sealed container,
    the gas leakage estimation unit calculates the temperature of the inactive gas from the temperature at the bottom portion of the metallic sealed container and the feeding air temperature, and
    when the temperature of the inactive gas rises while the feeding air temperature decreases, occurrence of leakage of the inactive gas is determined.

8. The apparatus for detecting gas leakage from a radioactive material sealed container according to claim 6, wherein
    the physical amount is a heat flux emitted from the bottom portion of the metallic sealed container to the external air,
    the gas leakage estimation unit calculates a heat flux by multiplying a heat transfer coefficient at a bottom surface of the metallic sealed container by a difference between the temperature at the bottom portion of the metallic sealed container and the feeding air temperature, and when fluctuation of the heat flux is larger than threshold heat flux fluctuation, occurrence of leakage of the inactive gas is determined.

9. The apparatus for detecting gas leakage from a radioactive material sealed container according to claim 8, wherein the gas leakage estimation unit excludes a fluctuation amount of the heat flux caused by fluctuation of the feeding air temperature by adding, to the heat flux, a heat flux calculated by multiplying a coefficient $\alpha$ by the fluctuation amount of the feeding air temperature.

10. The apparatus for detecting gas leakage from a radioactive material sealed container according to claim 6, wherein the first temperature sensor measures a temperature at a bottom portion center of the metallic sealed container as the temperature at the bottom portion of the metallic sealed container.

11. The apparatus for detecting gas leakage from a radioactive material sealed container according to claim 6, wherein the first temperature sensor is inserted from an air inlet port of the metallic sealed container and also installed at a back surface of a metal plate mounted on a lifter movable up and down relative to the bottom portion of the metallic sealed container, and configured to measure a temperature at the back surface of the metal plate having a surface in a state of contacting the bottom portion of the metallic sealed container.

* * * * *